United States Patent [19]

Tubbs

[11] 4,179,746

[45] Dec. 18, 1979

[54] DIGITAL PROCESSOR SYSTEM WITH CONDITIONAL CARRY AND STATUS FUNCTION IN ARITHMETIC UNIT

[75] Inventor: Graham S. Tubbs, Houston, Tex.

[73] Assignee: Texas Instruments Incorporated, Dallas, Tex.

[21] Appl. No.: 706,711

[22] Filed: Jul. 19, 1976

[51] Int. Cl.² .................... G06F 7/50; G06F 13/00
[52] U.S. Cl. ................... 364/900; 364/768
[58] Field of Search .............. 340/172.5; 445/1; 235/156, 168, 176; 364/200 MS File, 900 MS File, 779, 782, 785, 768, 780, 783, 786

[56] References Cited

U.S. PATENT DOCUMENTS

| | | | |
|---|---|---|---|
| 3,492,658 | 1/1970 | Klett | 340/172.5 |
| 3,493,936 | 2/1970 | Gunderson et al. | 340/172.5 |
| 3,564,226 | 2/1971 | Seligman | 235/168 X |
| 3,571,582 | 3/1971 | Kelling | 235/176 X |
| 3,571,803 | 3/1971 | Huttenhoff et al. | 340/172.5 |
| 3,584,206 | 6/1971 | Evans | 235/176 X |
| 3,694,642 | 9/1972 | Grannis | 235/176 X |
| 3,704,361 | 11/1972 | Patterson | 235/168 X |
| 3,892,957 | 7/1975 | Bryant | 235/156 |

*Primary Examiner*—Melvin B. Chapnick
*Attorney, Agent, or Firm*—John G. Graham

[57] ABSTRACT

An electronic digital processor fabricated on a single MOS/LSI semiconductor chip includes an arithmetic unit operating on digits one at a time, with a carry output and a carry input. Commands for operating the processor are produced by decoding instruction words one at a time from a large instruction memory. A special status circuit is responsive to commands from instruction words to operate in several conditional modes. A carry input to the arithmetic unit is generated in response to whether carries were generated in either the current or previous digits being processed. Another status circuit provides the input for a conditional branch or call depending on whether a carry or compare logic signal is applied to the status circuit.

9 Claims, 31 Drawing Figures

Fig. 9

Instruction Map

*"Faked" ▨ Not Available in Branch Latch

| R0,R1,R2,R3,R4 | Hex. | R5,R6,R7,R8 → 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|---|
| | | 0 | 1 | 2 | 3 | 4 | 5 | 6 | 7 | 8 | 9 | A | B | C | D | E | F |
| 00000 | 00 | CCMX | ALEM | YNEA | XMA | DYN | IYC | CLA | DMAN | TKA | MNEA | TKM | | | SETR | KNE* | |
| 00001 | 01 | DMEA | DMA | CCLA | NDMEA | | AMAAC | | | CTMDYN | XDA | | | | | | |
| 00010 | 02 | | | TBIT | | | | | | TAY | TMA | TMY | TYA | TAMDYN | TAMIYC | TAMZA | TAM |
| 00011 | 03 | SAMAN | CPAIZ | IMAC | MNEZ | | | | | *TCY | *YNEC | *TCMIY | *ACACC | *ACNAA | *TAMACS | *ALEC | *YMCY |
| 00100 | 04 | | | | | | | | TCY | | | | | | | | |
| 00101 | 05 | | | | | | | | YNEC | | | | | | | | |
| 00110 | 06 | | | | | | | | TCMIY | | | | | | | | |
| 00111 | 07 | | | | | | | | ACACC | | | | | | | | |
| 01000 | 08 | | | | | | | | LDP | | | | | | | | |
| 01001 | 09 | | | | | | | | LDX | | | | | | | | |
| 01010 | 0A | | | SBIT | | | | RBIT | | | | | | | | | |
| 01011 | 0B | TDO | SAL | COMX8 | SBL | REAC | SEAC | OFF | | | | | | | | | RETN |
| 01100 | 0C | | | | | | | | ACNAA | | | | | | | | |
| 01101 | 0D | | | | | | | | TAMACS | | | | | | | | |
| 01110 | 0E | | | | | | | | ALEC | | | | | | | | |
| 01111 | 0F | | | | | | | | YMCY | | | | | | | | |
| 10000 | 10 | | | | | | | | | | | | | | | | |
| 10001 | 11 | | | | | | | | | | | | | | | | |
| 10010 | 12 | | | | | | BRANCH | | | | | | | | | | |
| 10011 | 13 | | | | | | | | | | | | | | | | |
| 10100 | 14 | | | | | | | | | | | | | | | | |
| 10101 | 15 | | | | | | | | | | | | | | | | |
| 10110 | 16 | | | | | | | | | | | | | | | | |
| 10111 | 17 | | | | | | | | | | | | | | | | |
| 11000 | 18 | | | | | | | | | | | | | | | | |
| 11001 | 19 | | | | | | | | | | | | | | | | |
| 11010 | 1A | | | | | | CALL | | | | | | | | | | |
| 11011 | 1B | | | | | | | | | | | | | | | | |
| 11100 | 1C | | | | | | | | | | | | | | | | |
| 11101 | 1D | | | | | | | | | | | | | | | | |
| 11110 | 1E | | | | | | | | | | | | | | | | |
| 11111 | 1F | | | | | | | | | | | | | | | | |

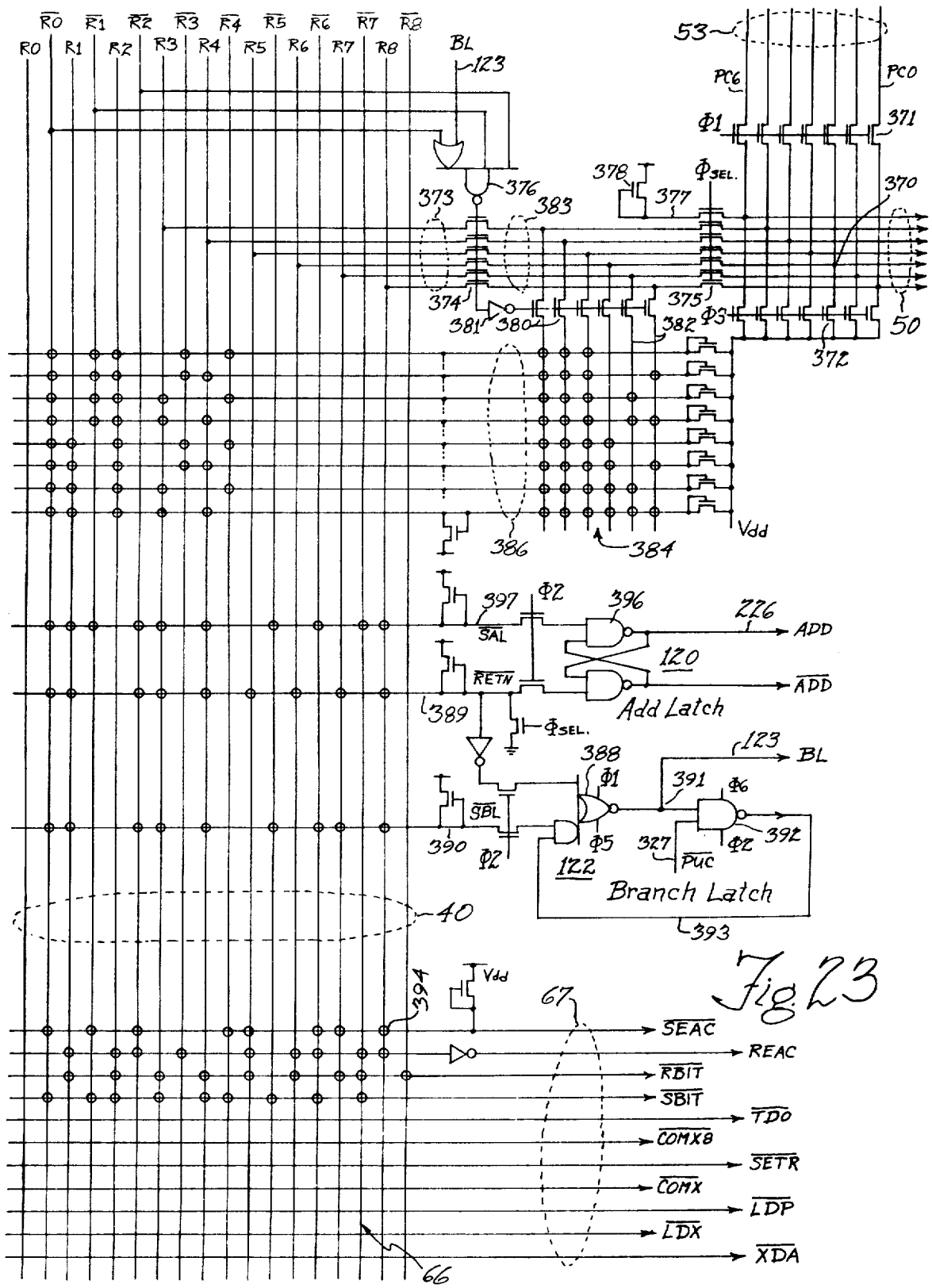

Microinstructions

DIGITAL PROCESSOR SYSTEM WITH CONDITIONAL CARRY AND STATUS FUNCTION IN ARITHMETIC UNIT

BACKGROUND OF THE INVENTION

This invention relates to electronic digital processor systems, and more particularly to an organization of an MOS/LSI semiconductor chip adapted for performing the functions of a calculator.

Miniature electronic calculators were made possible by the integrated semiconductor arrays such as shown in U.S. Pat No. 3,891,921, issued June 25, 1974 to Kilby, Merryman & VanTassel, assigned to Texas Instruments. In the ten years since the invention of integrated arrays for calculators, many advances in technology have resulted in great improvements in size, power, cost, functions and reliability in miniature calculators. All of the primary electronic functions of a calculator were incorporated into a single low cost MOS/LSI chip as described in patent application Ser. No. 163,565, (now Ser. No. 420,999) filed July 19, 1971 by Gary W. Borne and Michael J. Cochran, assigned to Texas Instruments; this "one-chip" calculator resulted in a versatile, 8 or 10 digit, full floating point calculator which eventually sold for less than $40. Further developments such as set forth in U.S. Pat. No. 3,892,957 issued July 1, 1975 to John D. Bryant, and U.S. Pat. No. 3,934,233 issued Jan. 20, 1976 to Roger J. Fisher and Gerald D. Rogers, both assigned to Texas Instruments, allowed more of the circuitry such as segment drivers, clock generators and the like to be included on the MOS/LSI chip, and very low power operation was achieved. This resulted in 5-function calculators which sold for less than $20 and could use low cost, throw away batteries with reasonable battery life. High level scientific calculators with log and trig functions, exponentiation and other complex functions, were made possible at low cost by an MOS/LSI chip set which is described in U.S. Pat. NO. 3,900,722, issued Aug. 19, 1975, to Michael J. Cochran and Charles P. Grant; calculators of this type now sell at less than $50 compared to several hundred dollars only two years ago. A general purpose digit processor capable of providing many different calculator functions as well as being a microcomputer with self-contained ROM, RAM, and clock oscillator is the subject of U.S. Pat. No. 3,991,305, issued Nov. 9, 1976, filed Nov. 19, 1974 by Joseph H. Raymond and Edward R. Caudel, assigned to Texas Instruments. A major innovation in reducing the cost is that set forth in U.S. Pat. Nos. 4,014,012 and 4,014,013, issued Mar. 22, 1977, filed Apr. 7, 1975 by David J. McElroy and by Edward R. Caudel; this consisted of eliminating digit driver devices so that no semiconductor components or devices were needed outside the MOS/LSI, except of course the keyboard, display, battery and ON-OFF switch. The ON-OFF switch was incorporated into the keyboard as a momentary push-button device as set forth in copending application Ser. No. 695,886 filed June 14, 1976 by David J. McElroy, and Ser. No. 700,672 filed June 28, 1976 by McElroy, Graham S. Tubbs and Charles J. Southard, both assigned to Texas Instruments.

All of these development efforts have aimed at reducing the manufacturing cost of the calculator and increasing its functions. These are the objectives of the present invention.

While simple addition, subtraction, multiplication and division can be executed so rapidly on a calculator of the types mentioned above, the execution time becomes a potentially annoying factor where complex functions such as logs and trigs are introduced. Indeed, the execution time in some cases becomes the limiting factor which prevents math functions from being added to a new calculator design.

It is a principal object of the invention to provide an MOS/LSI calculator chip which has reduced execution time for mathematical operations. Another object is to provide a digit processor system having an improved instruction set. A further object is to provide a versatile and low cost calculator or digital processor device.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 9 is an instruction map showing the instruction set of the system herein described, with bits R0 to R4 plotted as a function of bits R5 to R8;

FIG. 16 is a detailed electrical and logic diagram of the ROM 30 of FIG. 7a;

FIG. 17 is a detailed electrical and logic diagram of the ROM word address decoder and instruction code selector 44 of FIG. 7a;

FIG. 18 is a detailed electrical and logic diagram of the program counter 47 and subroutine register 54 of FIG. 7a;

FIG. 19 is a detailed electrical and logic diagram of the program counter feedback circuit 48 of FIG. 7a;

FIG. 20 is a detailed electrical and logic diagram of the ROM page address register 59 and buffer 60 of FIG. 7a;

FIG. 21 is a detailed electrical and logic diagram of the ROM page address controls 61 of FIG. 7a;

FIG. 22 is a detailed electrical and logic diagram of the CKB circuit 113 and keyboard input 111 of FIG. 7a;

FIG. 23 is a detailed electrical and logic diagram of the selector 51, decoder 66 and add and branch latches in the system of FIG. 7a;

FIG. 24 is a detailed electrical diagram of the microinstruction decoder 46 of FIG. 7a;

DETAILED DESCRIPTION OF SPECIFIC EMBODIMENT

Hand-held Electronic Calculator System

Figure 1:
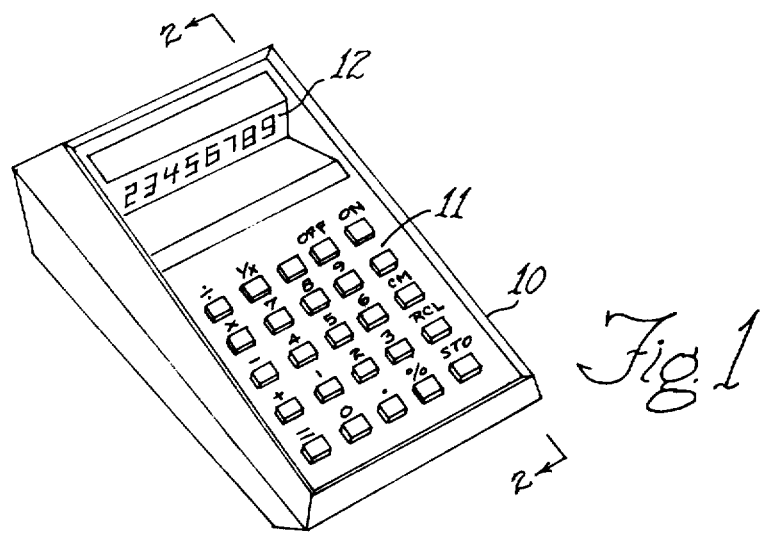
FIG. 1 is a pictorial view of a small hand-held calculator in which the digital processor system of the invention may be utilized.

Referring to FIG. 1, a typical small electronic calculator in which the invention may find utility is shown, comprising a case or housing 10 of molded plastic or the like, with a keyboard 11 and a display 12. The keyboard includes number keys 0-9, a decimal point key, and several standard operation keys such as +, −, =, ×, ÷, etc. In a preferred embodiment, the calculator system performs a variety of additional functions, so keys such as $\sqrt{x}$, $^x\sqrt{y}$, $Y^x$, SIN, COS, TAN, LOG, %, LN, STO, RCL, parenthesis (), etc., may be included in the keyboard 11. In accordance with copending applications Ser. No. 695,886, filed June 14, 1976 by David J. McElroy, and Ser. No. 700,672, filed June 28, 1976 1976 by David J. McElroy, Graham S. Tubbs, and Charles J. Southard, the keyboard includes ON and OFF keys in place of the usual ON-OFF slide switch. The display 12 has a number of digits of the seven segment type, with decimal points. Displays of eight, ten or twelve digits are standard and these may also include exponents for scientific notation, and minus sign for both mantissa and exponent. The system of the invention is designed to interface directly with visible light emitting diodes (LED's), although the display could also comprise vacuum fluorescent devices, a gas discharge panel, or liquid crystal devices, for example, with appropriate interface circuitry. The calculator is a self-contained unit having a power supply in the form of a single 9 v. battery within the housing 10, although an AC adapter may be attached, as well as a battery charger if rechargeable nickel cadmium batteries are used.

Figure 2:
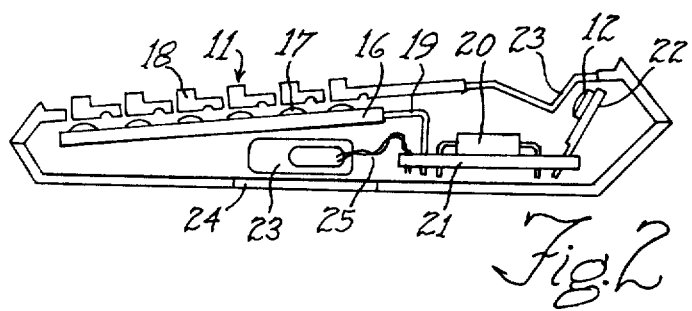
FIG. 2 is an elevation view in section of the calculator of FIG. 1, taken along with line 2—2 of FIG. 1.

In FIG. 2, the general form of the internal structure of the calculator of FIG. 1 is seen. The keyboard 11 includes an X-Y matrix keyboard device 16 of the type shown in U.S. Pat. No. 4,005,293, issued Jan. 25, 1977, assigned to Texas Instruments. The keyboard device 16 has flexible metal snap-acting discs 17 for each keyswitch, and these are pushed down by keys 18 which are an integral part of the top of the plastic housing 10. Thirteen rigid wires 19 extend from the end of the keyboard device 16 for connection to the electronic circuitry of the calculator. An MOS/LSI digital processor chip 20 according to the invention, programmed to provide the function of a calculator, contains all of the memory, arithmetic and control circuitry needed to implement the functions of a scientific calculator, as will be described. The chip 20 is encased in a standard twenty-eight pin dual-in-line plastic package for example, which is commonly used in the semiconductor industry. Depending upon the complexity of the calculator, and the multiplexing scheme used, the number of pins in the package could be more or less, and also other chip packaging and mounting techniques may be used. The chip 20 is connected to a printed or etched circuit board 21 by soldering the pins to conductors on the board, and the wires 19 are likewise soldered to the board. The VLED display 12 is mounted on a small PC board 22, beneath a red plastic lens 23 which enhances the visibility of the display. The PC board 22 is mounted on the board 21 by pins soldered to conductors on the board which make the desired connections from the chip 20 to the display. A 9 v. battery 23a is mounted in a compartment behind a door 24 in the housing 10, and is connected to the PC board 21 by wires 25 which are soldered to the PC board at one end and engage terminals of the battery by snap-on connectors at the other end.

The simplicity of the calculator is apparent from FIG. 2. It consists of a housing, a keyboard device, a chip, a display device, two small PC boards, and a battery. No components are needed on the board 21 except the chip 20, i.e., no resistors, capacitors, transistors, drivers, or any other devices. Thus, a high-level scientific calculator of the kind that retailed at several hundred dollars only a few years ago can be manufactured at much less than $20.

Figure 4:
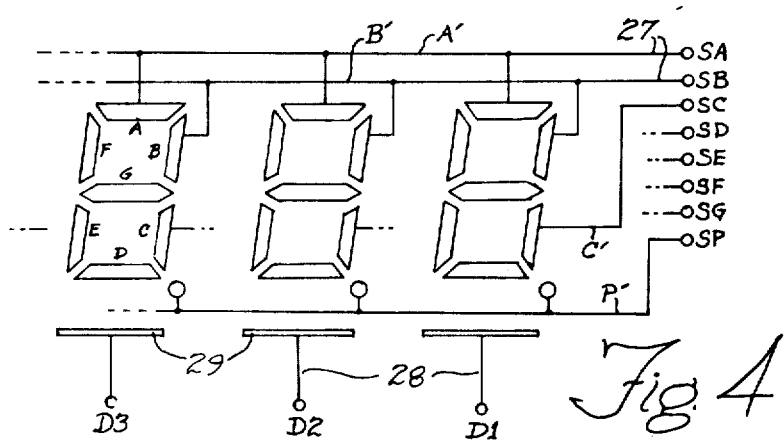
FIG. 4 is an electrical diagram of the display used in the calculator of FIGS. 1-3.
Figure 3:
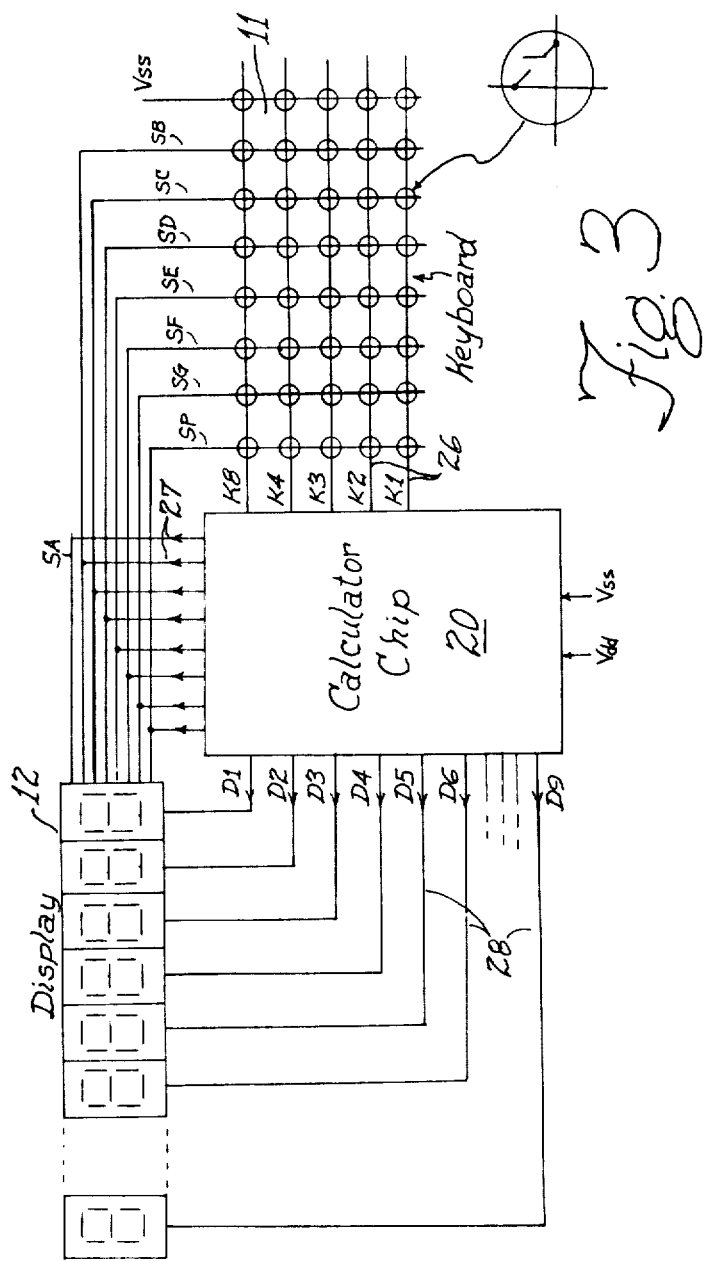
FIG. 3 is a block diagram of a display and keyboard scanning system used in the calculator of FIGS. 1 and 2.

The general organization of a calculator system as in FIG. 1 is seen in block diagram in FIG. 3, where the keyboard 11 and display 12 are interconnected with the semiconductor chip 20 employing display mutliplexing and keyboard scanning of the segment scan type set forth in U.S. Pat. No. 4,014,013, issued Mar. 22, 1977, filed Apr. 7, 1975. Inputs to the chip are by five "K lines" 26 which are five of the wires 19. Outputs from the chip include eight segment outputs SA to SP on lines 27 which are connected to common anode segments of the LED display 12. All like segments in each of the digits of the display are connected together as seen in FIG. 4, so only eight segment outputs are needed. The digits or cathodes of the display 12 are driven by output lines 28 which are labelled D1 to D6, etc., it being understood that there would be a number of output lines 28 corresponding to the number of digits or characters of the display 12. In the device to be described, nine digits are used. Seven of the segment lines 27 or SB to SP are also connected to the matrix of key switches which make up the keyboard 11, and the remaining line is connected to Vss. With eight segment output lines 27, the matrix contains eight times five or forty crosspoints so there are forth possible key positions, not all of which need be used. A minimum function calculator with only a [×], [÷], [+], [−], [=], [C], [.], [0-9], [ON] and [OFF] keyboard needs only nineteen keys, while a complex scientific calculator with trig and log functions, exponentials, memory and the like may use all forty keys. Other input/output pins for the chip 20 include a voltage supply or Vdd pin, and a ground or Vss pin.

Referring to FIG. 4, three digits of the display 12 are shown in more detail. Each digit is made up of seven segments A to G plus a decimal point P. The outputs 27 from the chip are labeled SA to SP corresponding to the segments in the display. All of the A segments are connected together by a line A', all B's are connected together by a line B', and C's by a line C', etc., and all decimal points P are connected together by a line P'. The segments A to P represent separate anodes sharing a common cathode in a LED unit. The digit outputs 28 are separately connected to cathodes 29. Cathodes are common to all anode segments in a digit for LED displays.

Figure 5:
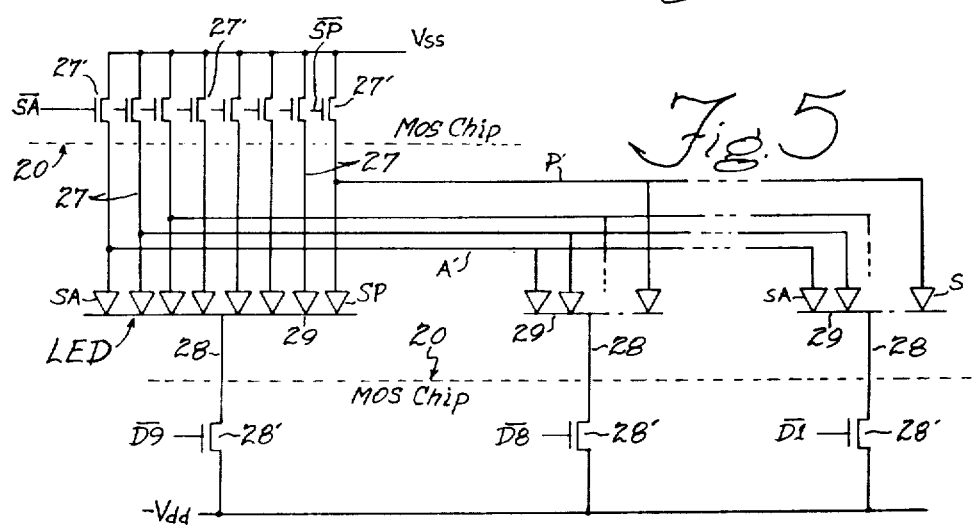
FIG. 5 is a schematic diagram of the display circuit of FIG. 4.

The display arrangement of FIG. 4 is illustrated in electrical schematic diagram form in FIG. 5. Each digit of the display 12 is comprised of an LED with a common cathode 29 and eight separate segments A to P. The cathodes 29 are each connected via a line 28 to the MOS chip 20, and the segment anodes are connected by lines 27 to the MOS chip.

Figure 6:
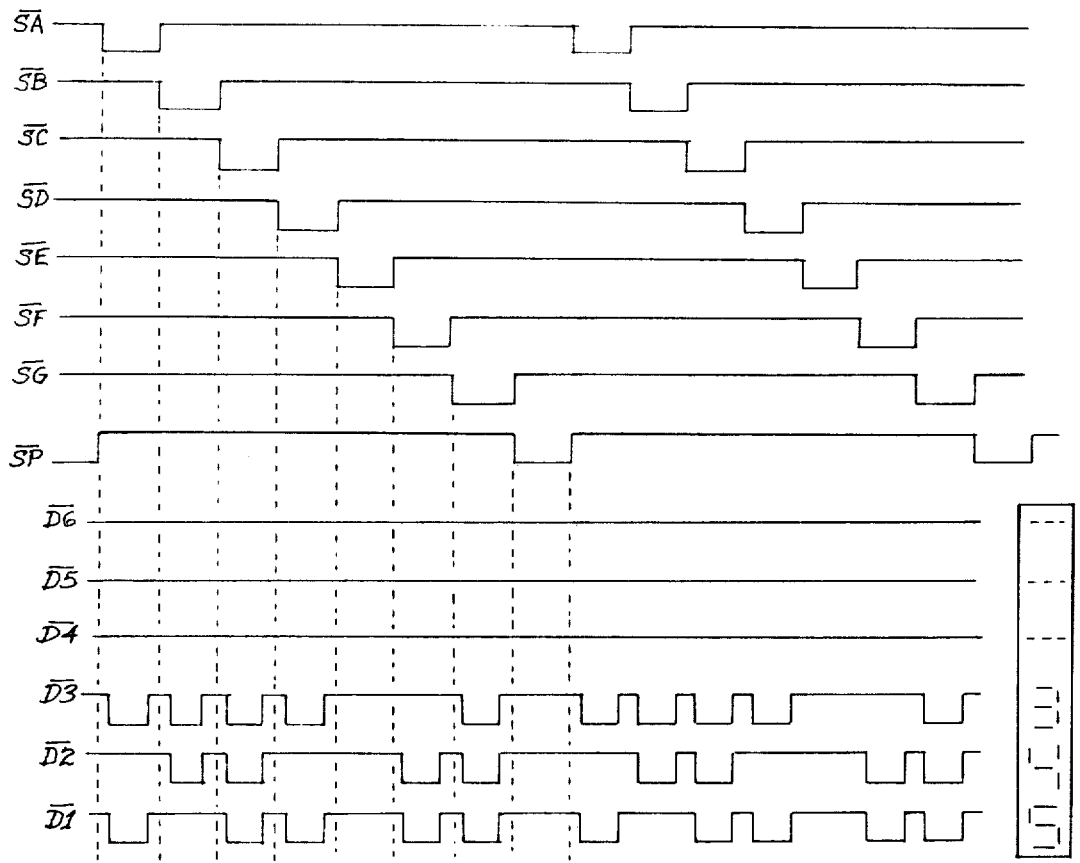
FIG. 6 is a timing diagram in the form of a graph of voltage vs time in the system of FIG. 3.

As seen in FIGS. 5 and 6 the segment outputs 27 are scanned or strobed in a regular repeating sequence of signals $\overline{SA}$ to $\overline{SP}$ which drive output transistors 27' on the MOS chip 20. The digits or cathodes of the LED's of the display 12 are selectively energized by output lines 28 labeled D1, D2, etc., by output transistors 28' on the MOS chip 20, in a coded manner synchronized with the segment scan signals $\overline{SA}$ to $\overline{SP}$ so that the desired digits will be visible, such as illustrated in the example of FIG. 6 (for simplicity, only six digits are shown). To show the decimal number 345 with leading zeros suppressed, only $\overline{D1}$, $\overline{D2}$ and $\overline{D3}$ signals will appear, and only in the code shown. For example, when segment SA is actuated, D3 and D1 will be actuated because the A segment appears in the "3" and "5" of digit positions three and one, respectively, but not in the "4" of digit position two.

The Digital Processor System

A clock diagram of the system within the chip 20 of the invention is shown in FIG. 9. This system is generally patterned after the digit processor chip described in U.S. Pat. Nos. 3,991,305 or 4,014,012. The system is centered around a ROM (read-only-memory) 30 and a RAM (random-access-memory) 31. The ROM 30 contains a large number, in this case 2048, instruction words of nine bits per word, and is used to store the program which operates the system. The RAM 31 contains 576 self-refresh memory cells software organized as nine sixteen-digit groups or "files" with four bits per digit. The files may be referred to as registers. The number of words in the ROM or cells in the RAM depends upon the desired complexity of the calculator functions. Numerical data entered by the keyboard is stored in the RAM 31, along with intermediate and final results of calculations, as well as status information or "flags," decimal point position and other working data. The RAM functions as the working registers of the calculator system, although it is not organized in a hardware sense as separate registers as would be true if shift registers or the like were used for this purpose. The RAM is addressed by a word address on lines 32, i.e., one out of sixteen word lines in the RAM is selected, by means of a RAM word address decode circuit 33. One of eight "pages" or files 0 to 7 of the RAM 31 is selected by an address signal on lines 34 applied to a RAM page address decoder 35 for the RAM, while a direct access memory DAM is addressed for write operation by the address circuit, as will be described. For a given word address on lines 32 and page address on lines 34, four specific bits are accessed and read out on RAM I/O lines 37, via the decoder 35 and an input/output circuit 36. Alternatively, data is written into the RAM 31 via the decoder 35 and input/output circuitry 36 from a RAM write control citcuit 38 via four lines 39. Some of the sixteen lines 32 used as RAM word address are also used to generate the digit signals for display actuation on the lines 28; to this end the lines 32 are also connected to output registers and buffers as will be explained.

The ROM 30 produces a nine bit instruction word on ROM output lines 40 during each instruction cycle. The instruction is selected from 18432 bit locations in the ROM, organized into 2048 words containing nine bits each. The ROM is partitioned or divided into nine sections 41, each section containing sixteen groups or pages of one-hundred-twenty-eight words each. A specific instruction in the ROM is addressed by a ROM word address on one of one-hundred-twenty-eight lines 42 and a ROM page address on one of sixteen lines 43 for each section 41. The ROM word address on lines 42 is generated in a decoder 44 which also provides, a one of sixty-four input 45 to an instruction word decoder 46, as will be explained. The encoded ROM word address is produced in a program counter 47 which is a multi-stage shift register that may be updated or incremented after an instruction cycle by a feedback circuit 48, or may have an address loaded into it via lines 49 from ROM output lines 40 for a call or branch operation. The ROM word address decoder 44 receives an encoded address on seven lines 50 from a selector unit 51 which has two inputs, one on lines 52 from the ROM output lines 40 and another on lines 53 from the program counter 47. The decoder unit 44 may receive a seven-bit ROM address from the program counter 47 via lines 53 and 50 and selector 51, or it may receive seven bits of an instruction word to be decoded in decoders 44 and 46 via lines 52 and 50. A six-bit subroutine register 54 is associated with the program counter 47 to serve as temporary storage for the return word address during call or subroutine operations. A ROM word address is stored in the register 54, via lines 55 when a call instruction is initiated so that this same address may be loaded back into the program counter 47 via lines 56 when execution of the subroutine which begins at the call location has been completed.

The ROM page address on lines 43 is produced in a decoder 57 which receives a four-bit encoded address on lines 58 from a page address register 59 which also has a buffer register 60 associated with it for subroutine purposes. The register 59 will always contain the current four-bit page address for the ROM, and directly accesses the ROM page decoder 57. The buffer register 60 is a multifunction buffer and temporary storage register, the contents of which can be the present ROM page address, an alternate ROM page address, or the return page address during subroutine operations. The ROM page addressing registers 59 and 60 are controlled by control circuitry 61 which receives inputs from the ROM output lines 40 via lines 62. The control circuitry 61 causes loading of part of an instruction word into the page address register via lines 63, and controls transfer of bits to the buffer register and back via lines 64 and 65.

The page addressing for the ROM 30 is not incremented; the page address may remain constant while the program counter 47 is being sequenced by the feedback circuit 48 or is branching within a page. Sequencing or branching to another page requires an instruction which loads a new page address into the register 60 via lines 63.

Numerical data and other information is operated upon in the system by a binary adder 70 which is a bit-parallel adder having a precharged carry circuit, operating in binary with software BCD correction. The inputs to the adder 70 are determined by P and N input selectors 71 and 72 which receive four-bit parallel inputs from several sources and select from these what inputs are applied to the adder on P and N input lines 73 and 74. First, the memory read or recall lines 37 from the RAM 31 provide one of the alternatives for both P and N inputs. Two registers receive the adder output 75, these being the "RAM Y" register 76 and an accumulator 77, and each of these has output lines 78 and 79 separately connected as inputs 80 and 81 of the selectors 71 and 72. The N selector 72 also receives the complement of the accumulator output 79, via four lines 82. Another input 83 to both sides receives an output from "CKB" logic as will be explained. Thus, the P adder input 73 is selected from the following sources: data memory or RAM 31 on lines 37; RAM Y register 76 via lines 78 and 80; constant, keyboard or "bit" information from CKB logic on lines 83; and a direct access memory which is part of RAM 31, via lines 84, and the complement of the direct access memory, on lines 85. The N adder input 74 is selected from the following: the output 79 from the accumulator 77 via lines 79 and 81; the complement of the accumulator output via lines 82; the CKB output on lines 83; and the memory output on lines 37. The selection is made by a plurality of command signals on lines 68 from the decoder 46, as will be explained in reference to the instruction set.

The output from the adder 70 is applied to either or both the RAM Y register 76 and the accumulator 77 via lines 75. All of the operations of the adder 70 and its input selectors 71 and 72, etc., are controlled by the data path control decoder 46 which is responsive to the instruction word on lines 40 from the ROM.

The four-bit output from the accumulator 77 is applied via lines 79 and 86 to a segment output arrangement which includes a part of the decoder 33; the decoder 33 functions to select one-of-sixteen for the RAM word address, and also functions to generate a compare signal.

The three LSB bits of the accumulator output are also applied to three segment latches 87 for the output display routine, and the output of the segment latches is applied via lines 88 to a segment decoder 89 which merely converts a three-bit encoded segment identification to a one-of-eight representation on eight lines 90. These lines 90 go to a part of the decoder which selects the digits to be actuated for a given number on the input 86 from the accumulator 77 and a given segment identified in the latches 87. The lines 90 also go via suitable buffers 91, to output terminals 92 which are the segment outputs on the lines 27 of FIG. 3, representing the signals of FIG. 6. One of the lines 67 from the decoder 66 applies a "TDO" or "transfer digits to output" command to the segment latches 87 when programmed to do so, and at the same time the currently addressed digit is loaded from the accumulator to the decoder 33. The segment identification loaded in the latches 87 will remain there until zeros are loaded to clear the latches. The decoder 89 is a standard decoder which accepts the three bit output of the latches 87 and actuates one-of-eight of the lines 90, i.e., actuating one of the segment outputs SA to SP, via output buffer transistors 27. The decoder 33, similar to a programmable logic array, also receives the four-bit output 86 from the accumulator 77, as well as the output of the decoder 89. After the latches 87 have been set up, the digits to be displayed are outputted, one at a time as the Y register 76 is decremented, from the accumulator 77, and the decoder 33 detects when the number in the then-addressed digit contains a segment which should be actuated. When this is true, a "display digit" or DDIG command is produced on a line 93, which is used to control a digit output as will be described.

The outputs 28 from the chip 20, used for display digit selection, are generated from the RAM word address on lines 32 by a set of digit output buffer registers 94 which are loaded under control of a "SETR" command on a line 95, a DDIG command on the line 93 from the decoder 33, and by RAM word lines 32. That is, the digit to be displayed is transferred from its place in the RAM 31 via adder 70 to accumulator 77 and to decoder 33; if this digit contains the segment next to be actuated as it appears as the output of decoder 89, the decoder 33 produces a DDIG output on the line 93, which will allow a SETR or "set command" to pass through a gate 96 from a line 95, so that whatever appears on the lines 32 will be loaded into the buffer register 94. The lines 32 are actuated in sequence as the Y register is decremented, corresponding to the positions being outputted via 79 and 86 to the decoder 33. After all digits in the number to be displayed have been examined, the register 94 will be set with all the digits to be actuated for the next segment. For the example of FIG. 6, while SA is to be actuated, the stages D1 and D3 would be set to contain 1's and all other stages would be at 0 to display 345. The output from the digit buffer register 94 is connected to a set of digit latches 97 which are loaded from the buffer register 94 by a TDO or "load command" on a line 67 from the control decoder 67. The outputs of the register 97 are connected to a set of output buffers 98 and thus to output terminals or pins 99.

Sixteen outputs are possible, but only nine would be needed in one example of a calculator design; eight digits for mantissa and one for minus sign or five digits for mantissa, two for exponent, and two for minus signs for mantissa and exponents in scientific notation. Thus, nine stages would be provided in the registers 94 and 97, so only the first nine of the sixteen address lines 32 would be used.

It is important that the register 94 is a random access register, where all bits are separately, independently, and mutually exclusively addressed. When one of the bits in the register 94 is addressed from decoder 33, either a "1" or "0" may be entered into this bit of the register 94 under control of the "set command" or SETR on a line 95 from the control decoder 67, i.e., from the current instruction word, as determined by the output of the decoder 33 in the segment output arrangement. This bit will remain in the defined state until again specifically addressed and changed; meanwhile any or all of the other bits may be addressed and set or reset in any order. It is possible to have any combination of register 94 bits set or reset, providing $2^9$ or 512 code combination (for a nine digit output) on the output terminals 99 or lines 28. Ordinarily, however, a routine is used whereby the nine stages of the register 94 are addressed in descending order, MSD to LSD, repetitively, to provide a scan cycle. After a scan cycle, or during power up or hardware clear, all the bits of the register 94 are unconditionally set to "0" except the LSD which may show a zero or other symbol to indicate that power is on.

Similar to the register 183, the other output via latches 87 is static in that the contents once entered will remain until intentionally altered. The latches 87 function as an output buffer, remaining set while the accumulator 77 is being manipulated to form the next output or to output the digits to the decoder 33. The output register 94 is a similar buffer for outputting the contents of the Y register 76, but has the additional feature of being fully random access. The data sources for the Y register 76 are the following: a four-bit constant stored in the ROM 30 as part of an instruction word; the accumulator 77 transferred to the Y register 76 via the selector 72 and adder 70; and data directly from the RAM 31 via the adder 70. Once data is in the Y register 76 it can be manipulated by additional instructions such as increment or decrement.

A logic circuit referred to as "special status" circuit 100 provides certain unique functions as will be further explained in reference to add and subtract operations. Special status circuit 100 receives a carry output C3 from the MSB of the adder 70 on a line 101, as well as a number of instructions and microinstruction commands, and an add latch output. The outputs produced by the special status circuit include a CO input to the LSB of the adder 70 on a line 102, and a STA or "store accumulator" command on a line 103 which goes to the write control logic circuit 38. The STA command causes the output from the accumulator 77 on lines 79 to be stored in the addressed page and word location of the RAM 31 via control circuit 38 and lines 39. The special status circuit provides an "end around carry" operation whereby addition and subtraction may be done in a smaller number of instruction cycles because the carry input from the previous digit is available on the line 102 at the LSB without a separate instruction which merely functions to check a carry latch.

A status logic circuit 104 provides the function of examining the MSB carry output C3 on the line 101 or a compare COMP output from the adder 70 on a line 105, and producing a STAT signal on a line 106 and a BRNCL or branch or call indication on a line 107. BRNCL is used in applying the program counter 47 address to the subroutine register 54, for example. Thus, the status circuit 104 mainly functions to set up the condition for a conditional branch.

A control circuit 38 determines what and when data is written into or stored in the RAM 31 via decoder and input/output control 35 and lines 37 and 39. This RAM write control 38 receives inputs from either the accumulator 77 via lines 79 or the CKB logic via lines 83, and this circuit produces an output on lines 39 which go to the RMA I/O circuit 35. Selection of what is written into the RAM is made by the instruction word on lines 40, via the data path control decoder 46 and command lines 68. Constants or keyboard information, from CKB lines 83, as well as the adder ouput via the accumulator, may be written into the RAM via the write control 38, and further the CKB lines 83 can be used to control the setting and resetting of bits in the RAM, via the write control 38.

The RAM page address location into which data is written is determined by four bits of the instruction word on lines 40, as applied via lines 108 to a RAM page address register 109 and thus to lines 34 which select the RAM page or one-of-eight of the files 0 to 7. The RAM word or Y address is of course selected by the contents of RAM Y register 76, and decoder 33. The MSB of the four-bit address on the lines 108 is applied to the DAM write select circuit 35; when this MSB is "1" the DAM is written into, i.e., the data on the lines 39 is applied to the DAM, but when it is "0" the DAM cannot be written into. Thus, data may be written into one of the files 0–7 and also into the DAM. No address is needed for read out from the DAM on the lines 84; the DAM is always unconditionally accessed for read.

The five keyboard inputs 26 appear internal to the chip 20 on lines 110, from a four bit coded input produced by a coder 111. For calculator applications, only one K line will be down at a given time so only one bit will appear on the K lines, K1, K2, K4 and K8; the others will be zeros. The decoder 111 merely functions to produce a 1100 four bit code on lines 112 when K3 is down, the other lines passing straight through. The lines 112 are an input to the CKB logic 113 and to the ROM page register 60. Five inputs are shown, although some calculator systems may need only three or four. It is seen that the keyboard input may be applied via CKB logic 113, lines 83 and the adder 70 to the accumulator 77 or RAM Y register 76, from whence it is processed by software or ROM programming, or it can be used as a ROM page address via register 60 to produce a branch.

Also included within the chip 20 is a clock oscillator 114 and clock generator 115. The oscillator 114 generates internally a basic clock frequency of about 250 to 450 KHz, and from this clock generator 115 produces a number of clocks used throughout the system. A power-up-clear circuit 116 produces controls including a $\overline{PUC}$ command which clear the calculator after the power is turned on.

A special circuit referred to as the add latch 120 produces an input to the special status circuit 100 in response to a $\overline{SAL}$ or "set add latch" instruction. When the add latch is set it will allow the special status circuit 100, on an SSE or "Special Status Enable" instruction, to store the "OR" function of both the previous and present carry C3 of the MSB of the adder 70. The add latch is reset by a $\overline{RETN}$ or "return" command. When the add latch is reset, the special status circuit 100 can sense, on an SSE instruction, the carry C3 from only the previous instruction cycle. Generally, the add latch 120 is set prior to going into an addition routine and reset when leaving the routine.

Another special circuit referred to as the branch latch 122 functions to cause a branch instruction to be decoded not only as a branch, but also as an instruction or op code. The branch latch is set by an $\overline{SBL}$ or "set branch latch" command, and reset by an $\overline{RETN}$ or "return" command. The output of the branch latch 122 on a line 123 is applied to the selector PLA 51. When set, a BL command on the line 123 will allow the microinstruction decode to decode RO as a logical "0" for a certain class of instructions.

The System Timing

Figure 7A:
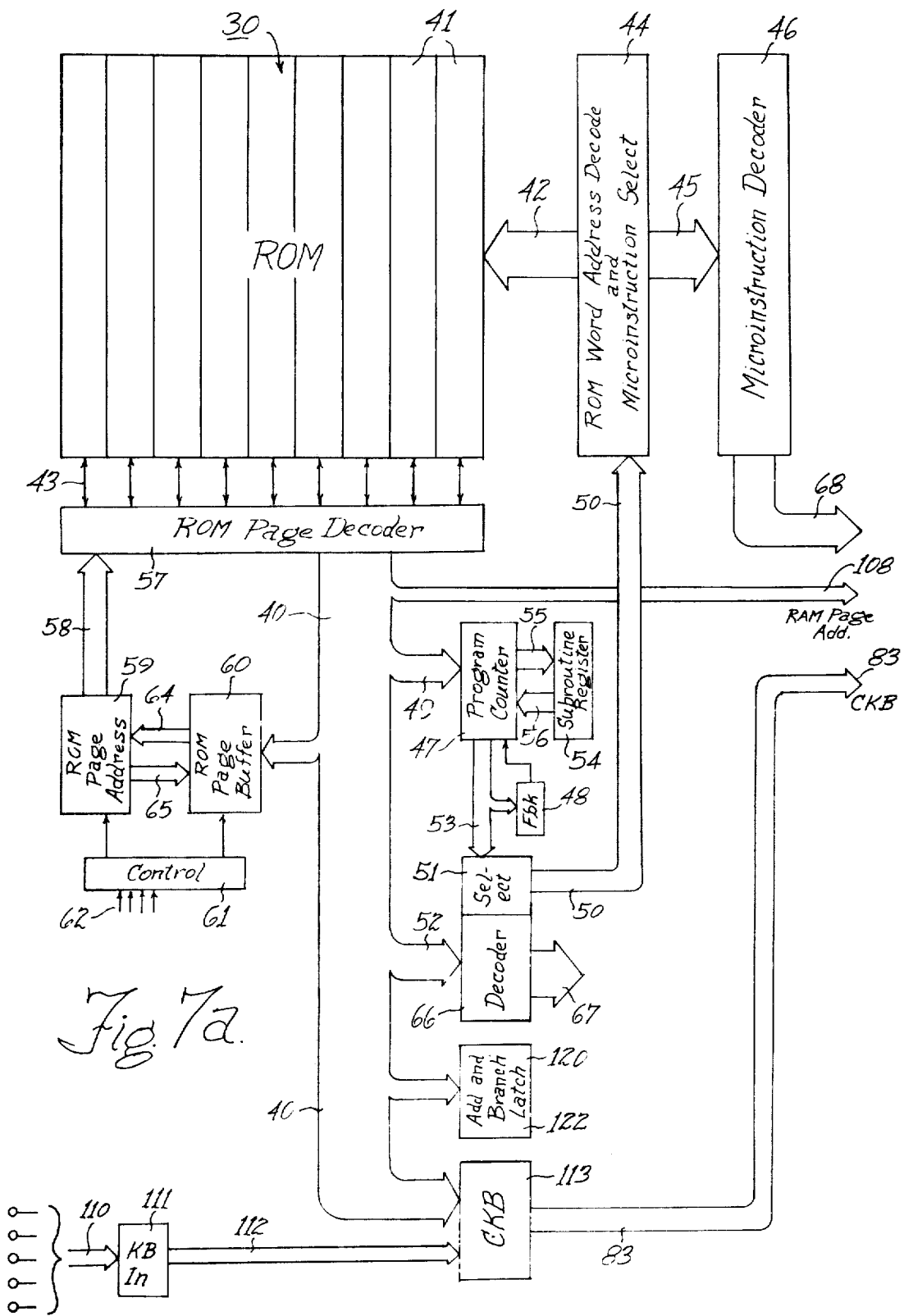
FIGS. 7a and 7b together are a block diagram of the digital processor system of the invention, embodied in the calculator chip 20 of FIG. 3.
Figure 7B:
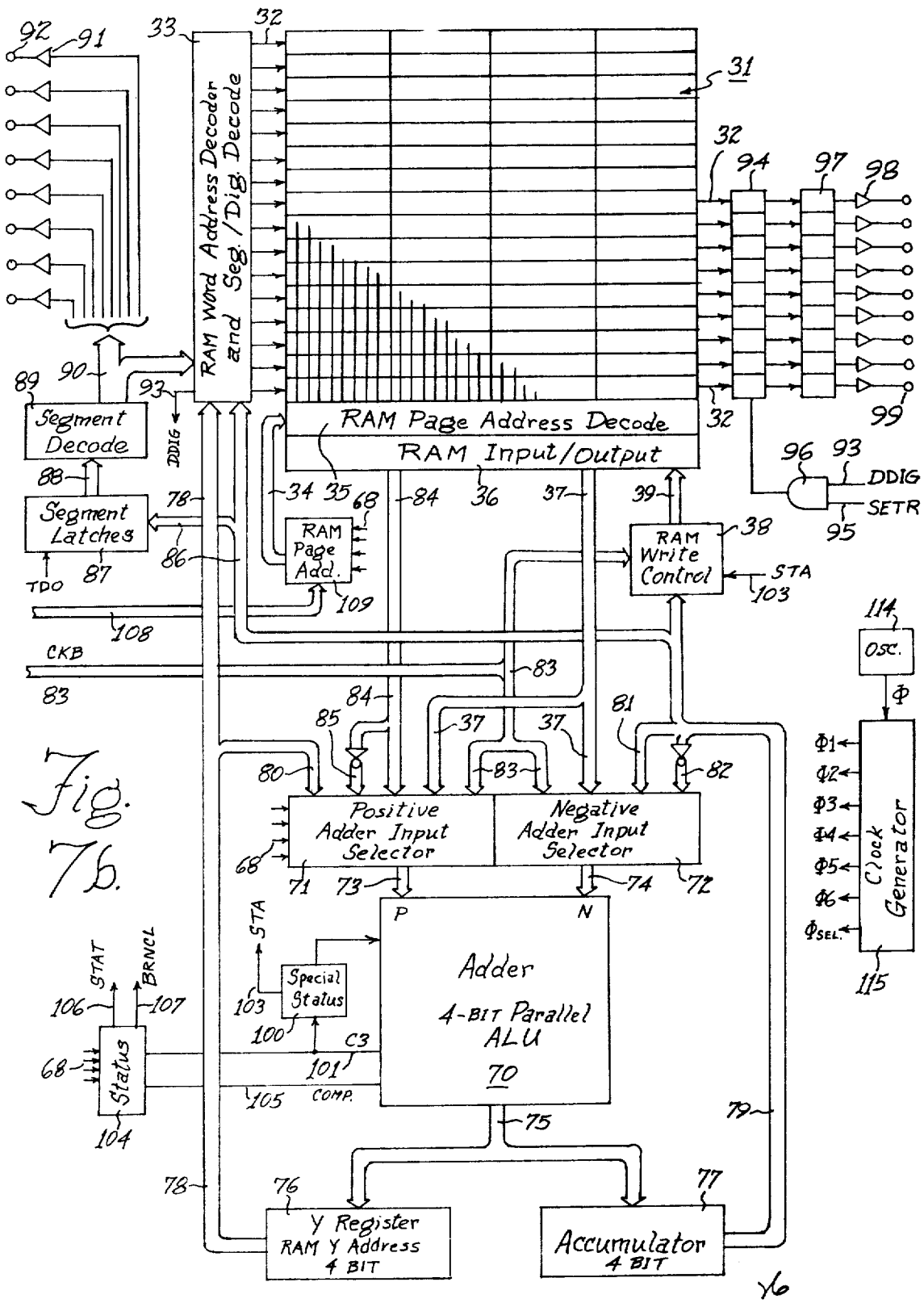
Figure 8:
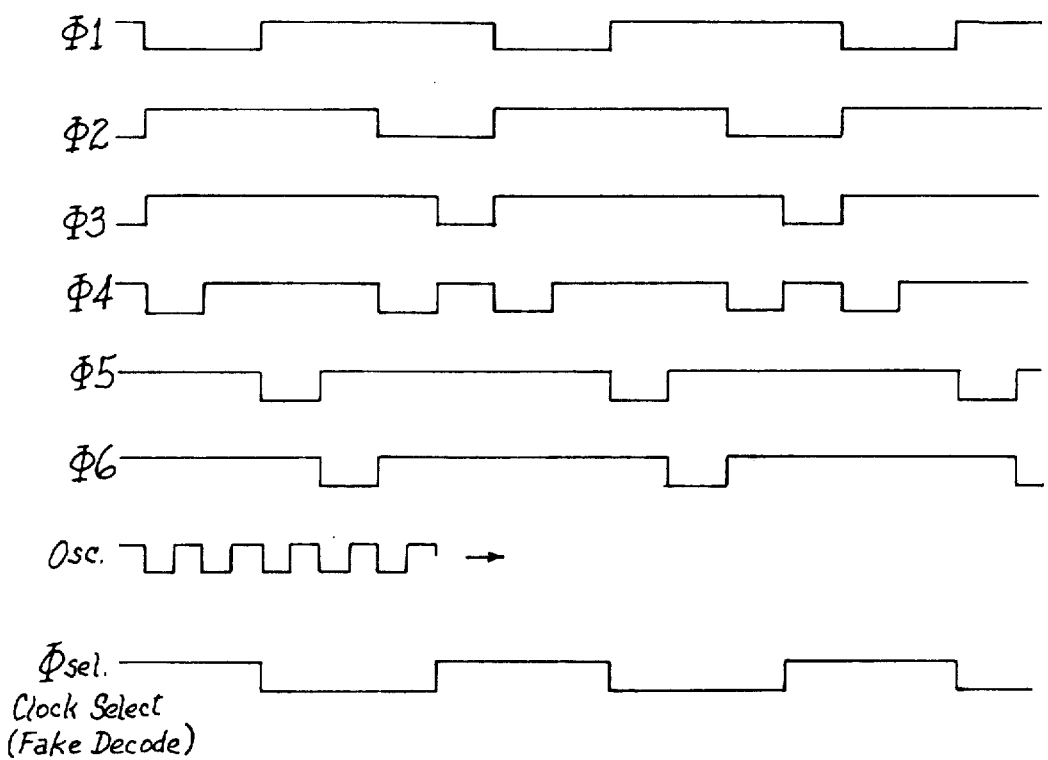
FIG. 8 is a timing diagram in voltage vs time for the clocks in the system herein described.

Referring to FIG. 8, a timing diagram is shown for the system of FIGS. 7a and 7b and the detailed circuits to be described below. An instruction cycle or machine cycle includes a set of all clocks $\phi 1$ to $\phi 6$, and this time 130 is about 13 to 24 microseconds, based on a clock $\phi$ frequency of 250 to 450 HKz. Generally, the dwell time or a given segment output would be about forty instruction cycles, and there are eight segments, so a scan cycle would be about 4 to 8 milliseconds or in the one to two hundred scans per second range, well above that which would cause perceptible flickering. Also, a key on the keyboard would be pressed down for probably at least 100 milliseconds, so adequate time is allowed in the scan cycle for input routines. The maximum permissible calculation time for a hand-held calculator, executing a lengthy trig or exponential function, is about one second; this permits at least forty to fifty thousand instruction cycles to be executed. It is for this reason that the reduction in instruction cycles for add and subtract operations is important, since all mathematical functions are based on add and subtract, in complex series.

The Instruction Set

A narrative explanation of what occurs for each of the microinstructions produced by the decoder 48 in lines 68 is set forth in Table I. Table II sets forth the instruction set in detail, including a list of microinstructions occurring for each op code.

The Adder

Figure 10:
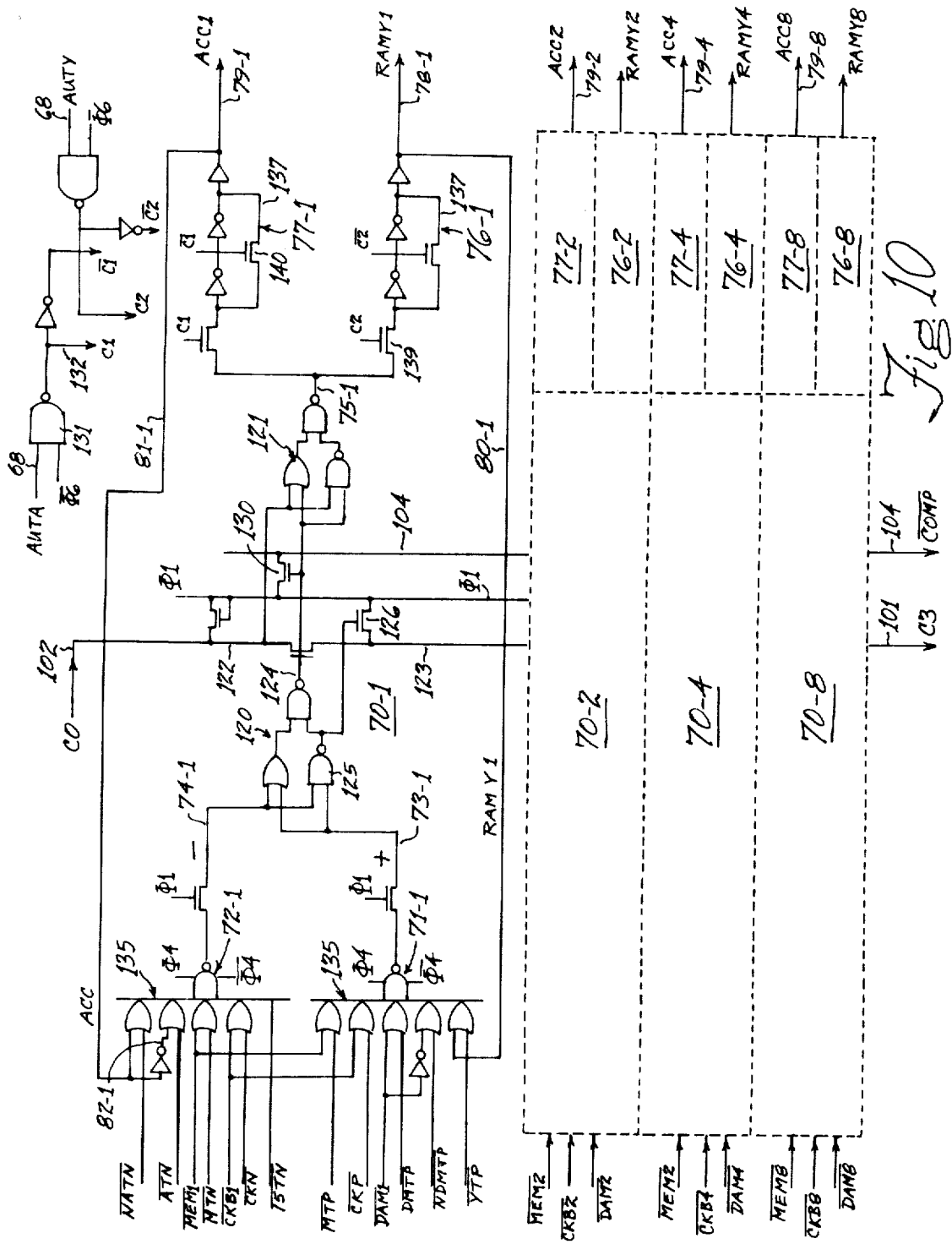
FIG. 10 is a detailed electrical and logic diagram of the adder 70 of FIG. 7b.

As shown in detail in FIG. 10, the binary adder 70 consists of a set of four parallel adder stages 70-1, 70-2, 70-4 and 70-8; all four of the stages are basically the same. Considering the LSB stage 70-1, each adder stage consists of a first complex gate 120 and a second complex gate 121, a carry input 122 and a carry output 123. The complex gate 120 receives two inputs 73-1 and 74-1, sometimes identified as positive and negative inputs, and produces an output on line 124 which is the "exclusive or" or "equivalence" function of the inputs on 73-1 and 74-1. A carry output is produced on the line 123 by first precharging the line 123 to a "0" or Vdd on $\phi1$, then conditionally discharging when $\phi1$ goes to Vss, depending upon the output of a gate 125; when both inputs 73-1 and 74-1 are "1," one of the "generate" conditions for generating a carry is satisfied, so the output of gate 125 causes a device 126 to be conductive after $\phi1$ ends, discharging line 123 to Vss or "1." A carry signal is produced on line 123 going to the next stage 70-2 if both inputs 73-1 and 74-1 are "1," or if either of these is "1" and "carry in" or CO on line 122 is "1," or if both inputs 73-1 and 74-1 are "1" and "carry in" on line 122 is "1;" for all other situations, the line 123 remains at "0" or −Vdd after $\phi1$ ends since neither the path through device 126 or through a device 127, nor the next stage, permits a discharge. The carry input for the first bit comes from a line 102, the CO output from the special status circuit 100. Carry output C3 from the MSB stage 70-8 appears on line 101, which goes to the special status circuit 100 and to status latch 104.

The adder 70 provides a "compare" function, wherein a $\overline{COMP}$ output is produced on a line 105 which also goes to the status latch 104. The line 105 is charged by $\phi1$ to −Vdd by any of the four devices 130 which is conductive, then conditionally discharged on $\phi1$ by any one of the devices 130 turned on by the outputs 124 of the gates 120. Conditional discharge occurs if line 124 goes to −Vdd, which occurs if the inputs to complex gate 120 at 73-1 and 74-1 are not the same. When all of the inputs 73 are the same as the inputs 74, COMP will be "1," otherwise "0."

Outputs from the adder stages 70-1, 70-2, etc., are produced on lines 75-1, 75-2, 75-4 and 75-8, which are the outputs of the complex gates 121. The gates 121 receive inputs 124 and "carry in" for that bit on lines 122, etc. The gates 121 produce an "equivalence" function of the outputs 124 and carry in. During $\phi1$, these outputs 75 are not valid, because the carry circuit is being precharged. Carry is not valid, so the outputs 75 are not valid, until after $\phi1$ ends. The adder output 59-1 is an input to either the accumulator register stage 77-1 or the RAM Y register stage 76-1, depending upon inputs 68-9 and 68-10 from the ALU control decoder 46 referred to as AUTA and AUTY. These controls go through inverting gates 131 which also have $\overline{\phi6}$ inputs, providing C1 and C2 control lines 132 and 133 which can be at −Vdd only when $\overline{\phi6}$ is at Vss; thus, the accumulator 77 and Y register 76 can be loaded only during $\phi6$.

The Adder Input Select

As shown in FIG. 10, the adder input selectors 71 and 72 include, for each bit of the adder, two sets of complex gating arrangements 71-1 and 72-1, etc., each consisting of complex NAND/NOR gates 135 and 136. The gate 136 receives five control inputs 68 from the ALU control decoder 46, referred to as $\overline{15TN}$, $\overline{CKN}$, $\overline{MTN}$, $\overline{ATN}$ and $\overline{NATN}$, which determine whether the negative input 74-1 will be either unconditional "1," or $\overline{CKB1}$, or $\overline{MEM1}$, or $\overline{ACC1}$, or ACC1, respectively. Only one of the five control inputs can be at −Vdd during a given instruction cycle. The data read out from the RAM 31 appears on lines 37-1, 37-2, etc., from FIG. 11, and is referred to as $\overline{MEM1}$, $\overline{MEM2}$, etc. The data from the accumulator 77 appears on lines 81-1 and 82-1 in true and inverted form, as ACC1 and $\overline{ACC1}$ inputs to the selector 72-1, so either the accumulator data or its complement may be the adder negative input. The gate 135 for the positive adder input also receives five control inputs 68 from the ALU control decoder 46, referred to as YTP, NDMTP, DMTP, CKP, MTP, which determine whether the positive input 73-1 will be either Y1 line 80-1, or the complement of the $\overline{DAM1}$ output on the line 85-1, or the $\overline{DAM1}$ data on line 84-1, or $\overline{CKB1}$ on line 83, or $\overline{MEM1}$ on line 37-1, respectively. Again, only one of these five control inputs is at −Vdd within a given cycle.

The Accumulator and RAM Y Register

FIG. 10 also shows the accumulator register 77 which contains four like stages 77-1, 77-2, 77-4 and 77-8, as well as the RAM Y register 76 which has four like stages 76-1 to 76-8. Each stage of these registers is a conventional one-stage shift register which recirculates upon itself via paths 137, so bits entered into ACC or RAM Y will stay until new data is entered. The stages each consist of two inverters and two clocked transfer devices, clocked on $\phi2$ then $\phi1$, of conventional form. Selection of whether the adder outputs 75 go to ACC or RAM Y is made by AUTA and AUTY commands on lines 68 and gates 131, which produce controls C1 and C2 on lines 132 and 133 to turn on either device 138 or device 139. Data is valid at the outputs 75 from the adder 70 after $\phi1$ goes to Vss, so the lines 132 and 133 do not go to −Vdd until after $\overline{\phi6}$ goes to Vss; this is the function of gates 131. Once data is written into ACC 77 or Y register 76, it stays until different data is written in. The device 140 in the recirculate paths 137 are turned on so long as $\overline{C1}$ and $\overline{C2}$ are at −Vdd, which occurs when $\overline{\phi6}$ is at Vss, unless AUTA or AUTY is at −Vdd.

The outputs 78-1, 78-2, etc., from the Y Register 76 and the outputs 79-1, etc., from the accumulator 77 are valid soon after $\overline{\phi 6}$ goes to Vss, i.e., during $\phi 6$ after $\phi 1$ ends.

The Data Memory

Figure 11:
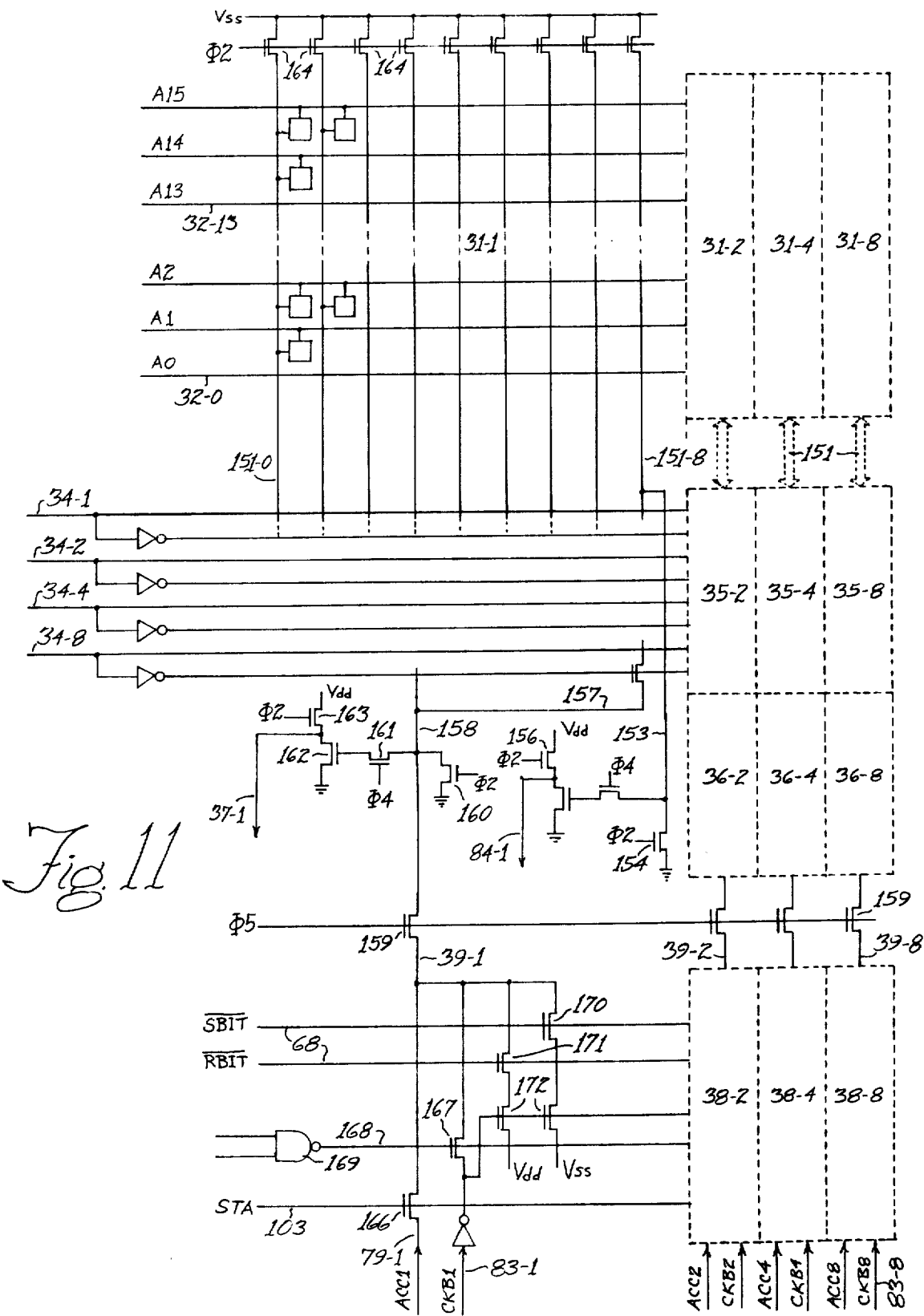
FIG. 11 is a detailed electrical and logic diagram of the RAM 31 of FIG. 7b.

Referring to FIG. 11, the RAM 31 and it input/output control circuitry is illustrated. The RAM 31 is composed of an array of five hundred seventy-six cells 150, each of which is a self-refreshing memory cell as described in U.S. Pat. No. 3,955,181, issued May 4, 1976, to Joseph Raymond, assigned to Texas Instruments; such patent being incorporated herein by reference. The array is organized 16×4×9, wherein sixteen address lines 32 provide the "RAM Y" address function; that is, the four-bit indication usually contained in RAM Y register 76 is decoded in the decoder 33 to select one of the sixteen lines 32. These lines are labeled 32-0 to 32-15, representing the A0 to A15 signals. The array of RAM 31 also includes thirty-six data input/output lines 151, these are arranged in four groups of nine, 151-0 to 151-8 being one group corresponding to the LSB's of the eight files and the DAM. The four-bit RAM X or RAM page address on lines 34 selects one-of-nine of the lines 151-0 to 151-8, etc., in each group, and causes the four selected lines, one from each group, to be connected to four input lines 39-1, 39-2, 39-4 and 39-8 which correspond to the write-in lines for the 1, 2, 4 and 8 bits for a four-bit BCD code. Note that for simplicity only some of the cells 150 and representative address lines 32 and input/output lines 151 are shown in FIG. 11; also, the $\phi 1$ and $\phi 5$ lines needed for each cell in the array are not shown in the Figure.

The RAM page decoder 35 comprises four like groups of transistors 152 which receive the four true RAM X address signals from lines 32, and four inverted RAM X address signals, and enable paths such that only one of the lines 151 in each group of nine is connected to the respective one of the lines 39 for write operations. If a binary code "0001" exists on lines 32 then line 151-1 would be connected to the line 39-1, and a corresponding one from the other three groups. A code "0011" would select the line 151-3 for write in.

For read-out, all of the eight files 0-7 are selected in the same way as for write-in, but the DAM is always unconditionally read out by a line 153, valid except during $\phi 2$ of each cycle where it is grounded by a device 154. On $\phi 4$ during $\phi 1$ of each cycle, data on line 153 of each group is applied to the gate of a device 155 which conditionally discharges DAM read line 84-1 for the LSB group. The line 84-1 is precharged to $-Vdd$ on $\phi 2$ by a device 156. The same circuits exist for the 2, 4 and 8 bits. The DAM is addressed for write-in by a "1000" address which connects a line 157 to the line 151-8.

The RAM I/O circuitry 36 comprises four like groups 36-1 . . . 36-8, each of which controls read or write for one bit. Each of the nodes 158 is connected to one of the four write lines 39 through one of four transistors 159 which are clocked on $\phi 5$, so that data reaches the nodes 158 for write in during the significant interval $\phi 5$, when it must exist on the selected line 151. The nodes 158 are shorted to Vss during $\phi 2$ by devices 160 which are clocked on $\phi 2$, so that all I/O lines are at Vss or logic "1" at the beginning of each cycle. For read out, all of the cells 150 on the selected address line 32 are read out onto lines 151 during $\phi 1$, then four selected lines 151 are then connected to the four nodes 158 during this $\phi 1$ time. This data goes through devices 161 which are clocked on at $\phi 4$ during $\phi 1$ time, into the gates of transistors 162. Transistors 163 precharge the output lines 37-1, 37-2, etc., during the previous $\phi 2$, and these output lines are conditionally discharged via devices 162 during $\phi 4$ ($\phi 1$) time. Thus the selected data will appear on read-out or recall lines 37-1, 37-2, etc., valid during $\phi 4$ ($\phi 1$) time. The gates of transistors 106 will be shorted to Vss through devices 160 and 161 during the $\phi 4$ ($\phi 2$) interval.

The lines 151 are shorted to Vss during $\phi 2$ by devices 164, since it is necessary for the lines to be at Vss before read-out which occurs during interval $\phi 1$ of the next cycle. All of the address lines 32 are at Vss during $\phi 2$; this is implemented in a buffer circuit 165 between the address decoder 33 and the address lines 32 which assures that an address is at $-Vdd$ and exists on only one of the lines 32 only during $\overline{\phi 2}$, and at all other times all of the lines 32 are at Vss. Only one address line can be on at a given time.

The Write Control Circuit

The RAM write control 38 includes four like circuits 38-1 . . . 38-8, only one being seen in FIG. 11. These circuits receive data inputs 79-1, 79-2, 79-4 and 79-8 from the accumulator 77, and also receive four data or control inputs 83-1 to 83-8 from the CKB logic 113. A transistor 166, under control of the voltage on a control line 103 when a "STA" command appears on the output from the special status circuit 100, following a STO command from the ALU control decoder 46, applies ACC1 to write line 39-1. A transistor 167, under control of the voltage on a control line 168 when a "CKM" or CKB-to-memory command appears on an output line 68 from decoder 46, rendered valid by a gate 169 only when $\phi 2$ is not at $-Vdd$, applies CKB1 to the write line 39-1. So, by these devices 166 and 167, the accumulator outputs 79 or the CKB data outputs 83 can be inputs to the memory 31. The other CKB function is also implemented on the control 38. Command signals $\overline{SBIT}$ or $\overline{RBIT}$ appearing on lines 68 as outputs from the ALU control decoder 46 are applied to the gates of transistors 170 and 171 to produce "1" or "0" (Vss or $-Vdd$) voltages, respectively, to the line 39-1 when these commands are at $-Vdd$. Transistors 172 in series with transistors 170 and 171, controlled by the CKB1 signal, enable the set and reset bit functions. Devices 170 and 171 in the four circuits 38-1 . . . 38-8 produce a ground or logic "1" on one write input line 39 to the RAM if $\overline{SBIT}$ is at $-Vdd$, for the one of four bits selected by the CKB lines 83. Likewise, the devices 171 and 172 produce a logic "0" on one input line 39 if $\overline{KBIT}$ is at $-Vdd$, for the selected bit. Only one of the CKB lines 83 can be at $-Vdd$ when CKB is functioning in the bit mode; the others are at ground which turns off transistors 172 for unselected bits. This permits setting or resetting a specific bit in the RAM 31, a function typically used for setting and resetting flags in calculator operation; a digit or word may be designated for flags, with one bit each as the add flag, minus flag, multiply flag and divided flag, for bookkeeping. Later, a specific flag bit is accessed via masking the adder inputs, again with CKB. The operation of testing flags is by the compare function in the adder 70. This mechanism allows the same controls and input select that are used in arithmetic functions be used in the test bit functions.

The RAM Page Address

Figure 12:
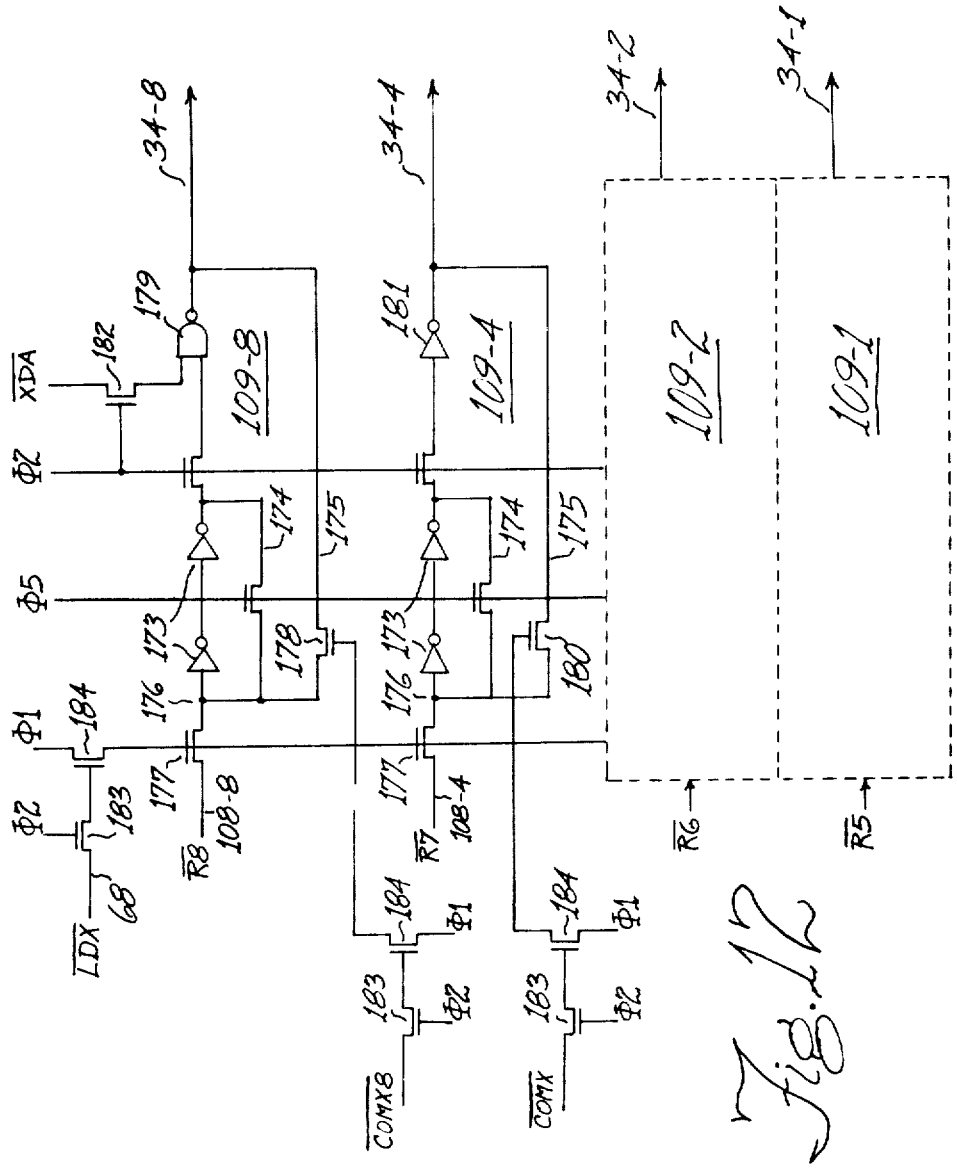
FIG. 12 is a detailed electrical and logic diagram of the RAM page address register 109 of FIG. 7b.

In FIG. 12 the RAM page address register 109 is shown; this circuit consists of three identical stages 109-1, 109-2 and 109-3 and one slightly different stage 109-8 for the DAM addressing, generating the address bits on lines 34. All stages have an input 108-1 . . . 108-8, two inverters 173, and two separate feedback paths 174 and 175. Each stage thus includes a recirculating register via path 174, clocked on $\phi 5$. A four-bit RAM page address may be loaded into input nodes 176, if devices 177 are turned on by an LDX or "load RAM X" command on a line 68 from the ALU control decoder 46. The address, once loaded, will recirculate indefinitely via path 174. The MSB of the four-bit RAM X address in the register 109 is complemented when a device 178 is turned on by a $\overline{\text{COMX8}}$ command on a line 68 from the ALU control decoder 46, when this command is a "0" or $-\text{Vdd}$. This causes recirculation via the path 175, and the bit which addresses the DAM for write operation will be complemented as it goes through a gate 179 which inverts the bit. The data is clocked into the gate 179 on $\phi 2$, then through the device 178 also on $\phi 2$; it overrides the data on node 176 which came through in $\phi 5$. When $\overline{\text{COMX}}$ is at $-\text{Vdd}$, the 1, 2 and 4 bits of the RAM page address will be complemented by recirculation through devices 180 and paths 175 in each stage. This path includes another inverter 181. Complementing the address saves instruction steps, compared to loading a new address. When $\overline{\text{COMX8}}$ and $\overline{\text{COMX}}$ are "1" or Vss, the four bits will recirculate via paths 174, and the address will remain the same.

The RAM page address is contained in the four-bit X register 109 which is used to directly address the RAM page decoder 35 via lines 34. The register 109 may be modified in several ways. First, $\overline{\text{R5}}$, $\overline{\text{R6}}$, $\overline{\text{R7}}$ and $\overline{\text{R8}}$ from the ROM 30 as part of the instruction word can be loaded by a $\overline{\text{LDX}}$ command, as described. Second, the address stored in the register 109 can be complemented, either the MSB in stage 109-8 for the DAM, or the three LSB's. An $\overline{\text{XDA}}$ command on an input to the gate 179, through a device 182 clocked on $\phi 2$, implements an "exchange DAM and Accumulator" instruction. No other mechanism, including power-up-clear and hardware clear, has any affect on the X register 109. Modifications of the register 109 are initiated by commands gated in through devices 183 on $\phi 2$, then are valid during $\phi 1$ of the next instruction cycle via devices 184.

The RAM Word/Segment Decoder

Figure 13:
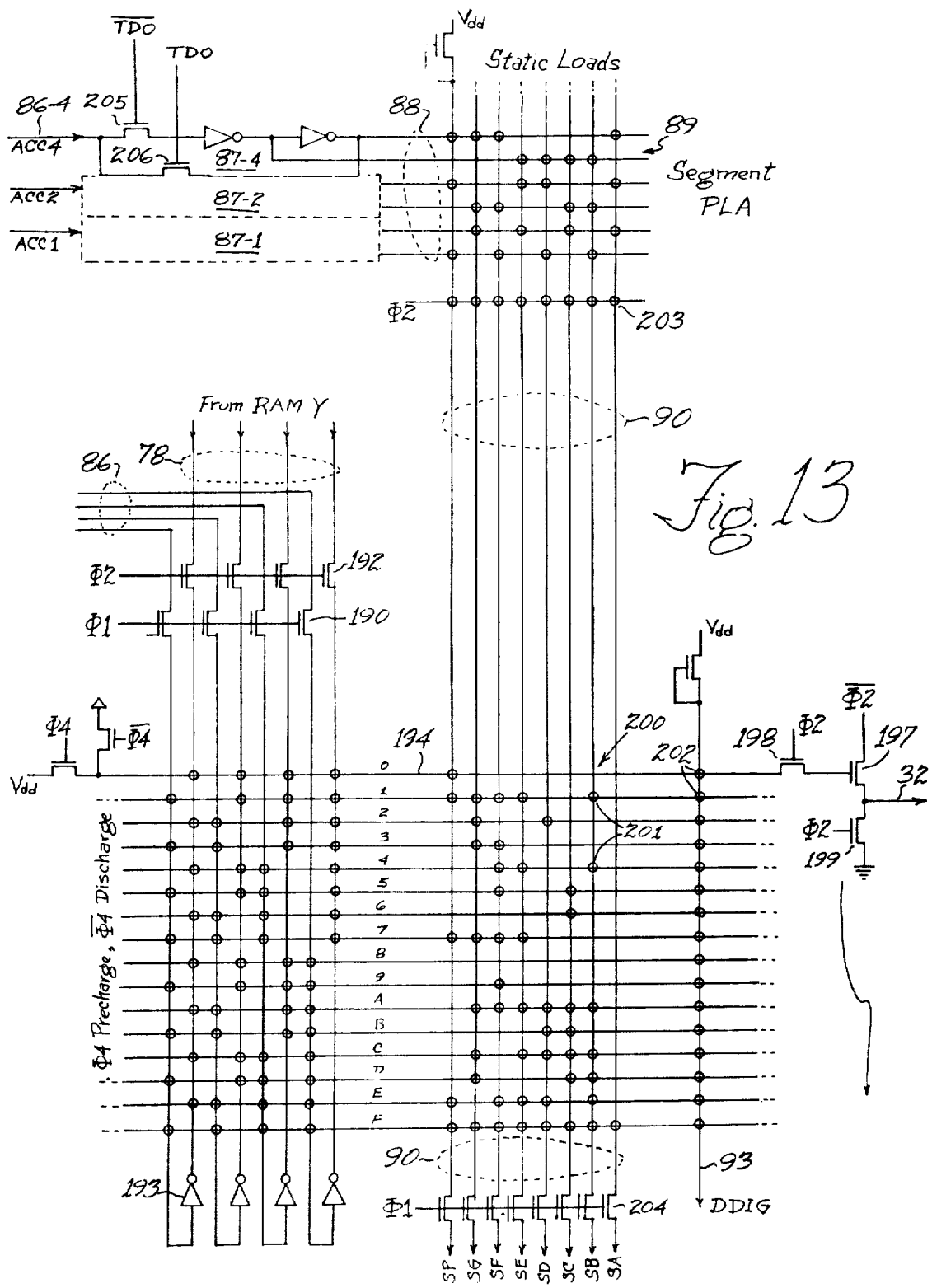
FIG. 13 is a detailed electrical and logic diagram of the RAM word address decoder and segment/digit decoder 33 of FIG. 7b.

In FIG. 13, the decoder 33 is shown in detail, along with the segment latches 87 and the segment decoder 89. The four-bit output from the accumulator 77 on lines 86 is applied to the input of the decoder 33 on $\phi 1$ of every instruction cycle through devices 190, where it drives a one-of-sixteen decoder section 191. Likewise, the four-bit output from the Y register 76 on lines 78 is applied to the decoder secction 191 via devices 192 clocked on $\phi 2$ every instruction cycle. Four inverters 193 generate the complements of each input. The decoder section 191, constructed as described in U.S. Pat. No. 3,541,543, assigned to Texas Instruments, functions to select one-of-sixteen of the lines 194, these lines having loads 195 clocked in $\phi 4$ and discharge devices 196 clocked on $\phi 4$. Thus, the decoder section 191 operates twice each instruction cycle, providing a decode of the accumulator contents valid at $\phi 4$ ($\phi 1$) and a decode of the contents of the Y register valid at $\phi 4$ ($\phi 2$). The lines 194 are gated out to source follower drivers 197 by devices 198 clocked on $\phi 2$. The gate of the device 197 is charged to $-\text{Vdd}$ during $\phi 2$ for the one line 194 which is at $-\text{Vdd}$, then on $\overline{\phi 2}$, one of the lines 32 will go to $-\text{Vdd}$; all others will remain at Vss. Thus, a one-of-sixteen selection of the lines 32 for RAM address occurs at $\overline{\phi 2}$, i.e., valid at the beginning of $\phi 1$ which is when the RAM output should be valid (during $\phi 1$ at device 161). A device 149 for each line 32 assures that all address lines are unconditionally grounded during $\phi 2$.

A decode section 200 also shares the lines 194; in this section the lines 194 are metallization and underlying lines 90 are P-diffusions, with P-diffusion Vss lines interleaved with the lines 90. One-of-eight of the lines 90 is at -31 Vdd, as determined by the three-bit contents of the segment latches as decoded by the decoder 89; all the other lines 90 are at ground. If there is coincidence of a gate 201, a line 194 at $-\text{Vdd}$, and a line 90 at $-\text{Vdd}$, the line 194 will go to Vss, so DDIG line 93 will stay at $-\text{Vdd}$, as the appropriate one of the gates 202 on the DDIG line 93 will not turn on and the line will not be shorted to Vss. The lines 90 are shorted to Vss on $\phi 2$ of each cycle by a set of devices 203, then the one of eight of the lines 90 which is at $-\text{Vdd}$ is gated out to the buffers 91 and terminals 92 on $\phi 1$ by a set of devices 204. The information on the lines 90 is unchanged by passing through the decoder section 200. The gate code for the gates 201 is selected according to which segments should be let up for a given number; thus "1" is defined by SB and SC, "2" by SA, SB, SD, SE, SG, etc. The codes for hex A to F are used for decimal point, minus sign, etc.

The segment latches 87 include three identical latch bits 87-1, 87-2, and 87-4, each of which receives one bit via the lines 86 from the accumulator output. Information is gated into the first inverter of each bit by a device 205 when $\overline{\text{TDO}}$ is at $-\text{Vdd}$, and recirculate feedback for each bit exists via a device 206 when TDO is $-\text{Vdd}$. The "transfer data out" or TDO command line from the decoder 66 will be at logic "0" or $-\text{Vdd}$ at all times except when the instruction code for TDO exists, at which time TDO goes to logic "1" or Vss and $\overline{\text{TDO}}$ goes to $-\text{Vdd}$. This condition allows the three LSD's of the accumulator to be loaded via devices 205 in one instruction cycle, then the three bits remain in the segment latch 87, recirculating via devices 206, until another TDO command occurs.

The Digit Buffers

Figure 14:
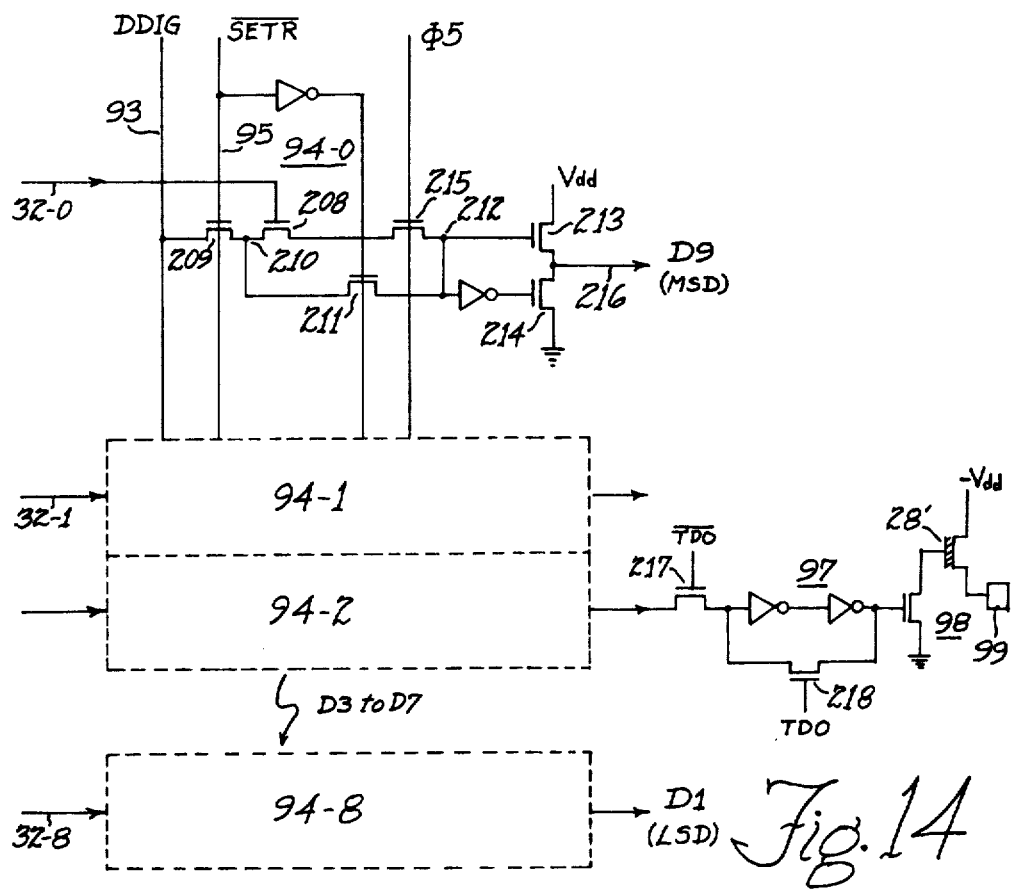
FIG. 14 is a detailed electrical and logic diagram of the digit output buffer 94, latches 97 and output buffer 98 of FIG. 7b.

In FIG. 14, the digit buffers 94, digit latches 97 and output buffers 98 are shown in detail. In this example, there are nine identical sets of stages, only one set being shown. In other calculators, or other uses of the invention in digital processors for other uses. There may be any other number of digit outputs, up to sixteen. Each output buffer 94 receives one of the Y address lines 32 which is applied to the gate of a transistor 208; usually in a display circuit routine the Y register would be decremented from Y=8 to Y=0 for each scan cycle while the buffers 94 are being set up for the next segment actuation. The DDIG command on the line 93 is allowed to pass through a transistor 209 to a node 210 when the $\overline{\text{SETR}}$ command on the line 95 is at $-\text{Vdd}$. DDIG occurs when the number at the current Y and page address in the RAM 31, as outputted through the accumulator 77 and the decoder sections 171 and 200, contains the segment to be next actuated in the display, as defined by the number in the segment latches 87 and on the lines 90. $\overline{\text{SETR}}$ is generated by an instruction code as one of the lines 67 from the decoder 66, and in addition to functioning to load the digit buffer 94, it decrements the Y register 76 and sets status of Y≠0. The $\overline{\text{SETR}}$ command also passes through an inverter to become SETR to drive a transistor 211 in a path between the node 210 and a node 212. The node 212 is applied directly to the gate of a transistor 213 and through an inverter to the gate of a transistor 214. Thus, only one of the transistors 213 or 214 can be on at a given time. The node 212 is also driven from the voltage on the node 210 through the transistor 208 and a transistor 215 which is gated on $\phi 5$. Thus, when DDIG is at −Vdd, $\overline{\text{SETR}}$ is at −Vdd (i.e., the command "set output register" exists), then the nodes 210 for all digits will be at −Vdd. For the digit of the current Y address, the transistor 208 will be on, and on $\phi 5$ of this cycle the node 212 will be changed to −Vdd and the transistor 213 will turn on, during a line 216 going to the digit latches to −Vdd. This condition will exist only until the next cycle. When DDIG does not occur, the node 210 is forced to Vss, and $\overline{\text{SETR}}$ drives the node 212 to Vss on $\phi 5$, turning on the transistor 214 in the selected stage 94-0 to 94-8, and causing the line 216 for this stage to be at Vss. The transistor 211 in each stage provides a means for changing all outputs 216 at Vss when $\overline{\text{SETR}}$ is not at −Vdd because the transistor 214 will be turned on in each stage at the cycle following a SETR command, assuming DDIG to have been at Vss.

Each digit output latch 97 is merely a conventional latch circuit which stores a "1" or "0" indefinitely until reset by its input 216. The digits containing the segment to be displayed are set to "1" and the others are set at "0." When $\overline{\text{TDO}}$ is at −Vdd, devices 217 load the information on line 216 into the latch stages, and in succeeding cycles, so long as TDO is at −Vdd, feedback exists through devices 218 and the data is retained. Output lines 219 from the digit latches go to output buffers 98 which comprise depletion mode transistors 28'. The digit output buffers should operate as a constant current source, i.e., should produce a set current through an LED segment regardless of how many digits have this segment turned on. The segment output buffers 91 act as constant voltage devices, operating at approximately ½ the supply Vdd, i.e., about −3 v., which gives approximately a Vp back bias on the terminal 99 for an off digit buffer transistor 28' operating in the depletion mode.

The Special Status and Status Circuits

Figure 15:
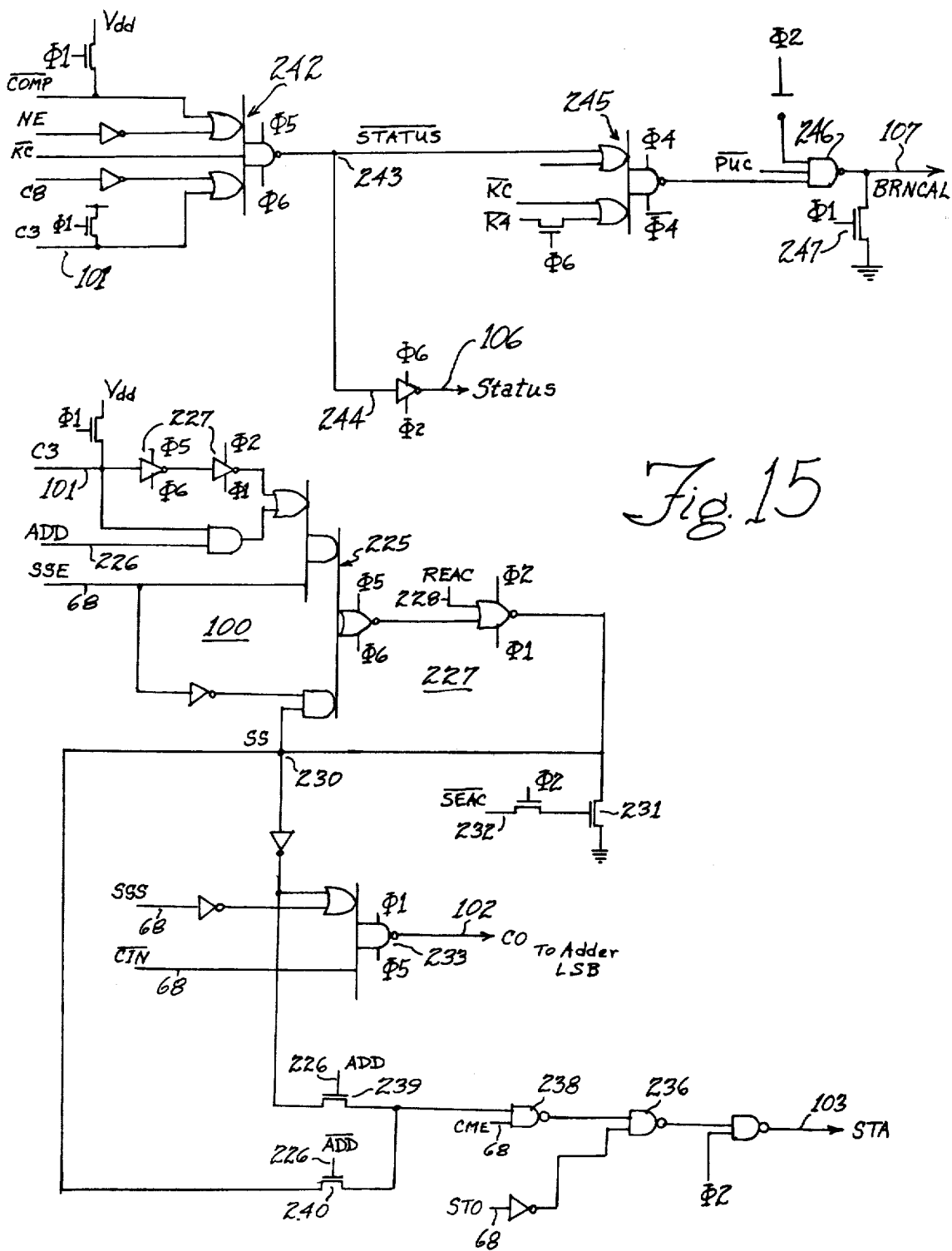
FIG. 15 is a detailed electrical and logic diagram of the special status circuit 100 and the status circuit 104 of FIG. 7b.

In FIG. 15, the special status circuit 100 which generates the end around carry for the adder 70 is illustrated. This circuit includes a first complex gate 225; this circuit receives the MSD carry C3 on line 101 from the adder 70, valid after $\phi 1$ ends. Also, the add latch 120 output ADD on a line 226 and an SSE or "special status enable" command on a line 68 from the ALU control decoder 46 are applied to this gate 225. A pair of clocked inverters 227 provide a delay of one instruction cycle for the carry input C3. This arrangement, along with an REAC command on a line 228 being at −Vdd, causes a latch 229 to be set or a special status node 230 to go to a "1" or Vss. An REAC command (reset end around carry or special status) on the line 228 causes this latch to be reset, i.e., causes the node 230 to go to −Vdd. The special status latch circuit 229 can be also set to "1" by a device 231 which is connected every $\phi 2$ to an $\overline{\text{SEAC}}$ command line 232, one of the outputs 67 of the decoder 66; thus, end around carry may be set by an instruction code. A gate 233 generates the LSD carry input C0 on line 102 from the logic levels existing at the special status node 230, an SSS "sample special status" command on a line 68 from the decoder 67, and a $\overline{\text{CIN}}$ "carry in to ALU" command on another line 68 from the ALU control decoder 67.

The special status circuit also generates a store accumulator command STA on the line 103, and this may be conditional or unconditional. A STO command on a line 68 from the decoder 67 unconditionally forces the line 103 to −Vdd via NAND gates 236 and 237. The STA command must be at −Vdd to turn on the transistors 116 in the write control 38. STA is forced to Vss during $\phi 2$ by the gate 237; write occurs only at $\phi 5$ via devices 159 of FIG. 11. STA on line 103 can be conditional when CME is at Vss or "1" at the input of a gate 238 of FIG. 15. CME is a "conditional memory enable" command on one of the lines 68 from the decoder 67. When the add latch 120 is set, the ADD line 226 will be at "1," $\overline{\text{ADD}}$ will be at "0," device 239 will be off and device 240 will be on, and the gate 238 will cause an STA command if special status node 230 is set. When the add latch is reset, the opposite conditions exist, and a store accumulator command is produced if special status node 230 is reset.

The status circuit 104, seen in FIG. 15, also receives the MSB C3 carry output 101, as well as a compare output $\overline{\text{COMP}}$ on a line 105, and produces a STATUS command on the line 106 or a branch/call command BRNCL on the line 107. A NOR/NAND gate 242 receives the $\overline{\text{COMP}}$ signal and an NE or "compare to status" command on a line 68 from the ALU control decoder 67, into one half. The other half of the complex gate receives the carry out signal on the line 101 and a C8 or "carry 8 to status" command on a line 68 from the decoder 67. The output of the complex gate 242 at a node 243 is inverted in a clocked invertor stage 244. The stage 244 is precharged on $\phi 6$ beginning at $\phi 2$ and lasting until the next $\phi 6$. STATUS exists for coincidence of $\overline{\text{COMP}}$ and NE, or C3 and C8, or $\overline{\text{KC}}$.

A complex gate 245 receives the $\overline{\text{STATUS}}$ signal from the node 243, as well as $\overline{\text{RO}}$ from the ROM output lines 40 in one half, and receives $\overline{\text{KC}}$ and $\overline{\text{K4}}$ in the other half. When $\overline{\text{RO}}$ is at −Vdd (i.e. RO is a "1") a branch or call instruction exists, and $\overline{\text{STATUS}}$ on node 243 can control the output of the gate 245; this can produce a BRNCL command on the line 107 as the output of a gate 246. The gate 246 also receives $\overline{\phi 2}$ as an output, so BRNCL can exist only during $\phi 2$. A device 247 grounds the line 107 during each $\phi 1$. The power up clear signal $\overline{\text{PUC}}$ is also an input to the gate 246.

Logical comparison $\overline{\text{COMP}}$ or carry out from the MSB C3 can affect status, if enabled, for one cycle only. If STATUS is at a logic "1" which is the normal state, then a conditional branch or call is executed. Status will go to a zero if carry out C3 is a zero and CB is enabled, or if all the bits compared are equal on a logical comparison instruction NE; in such a case, branches and calls are not performed.

The ROM and ROM Page Address Decoder

Figure 16:
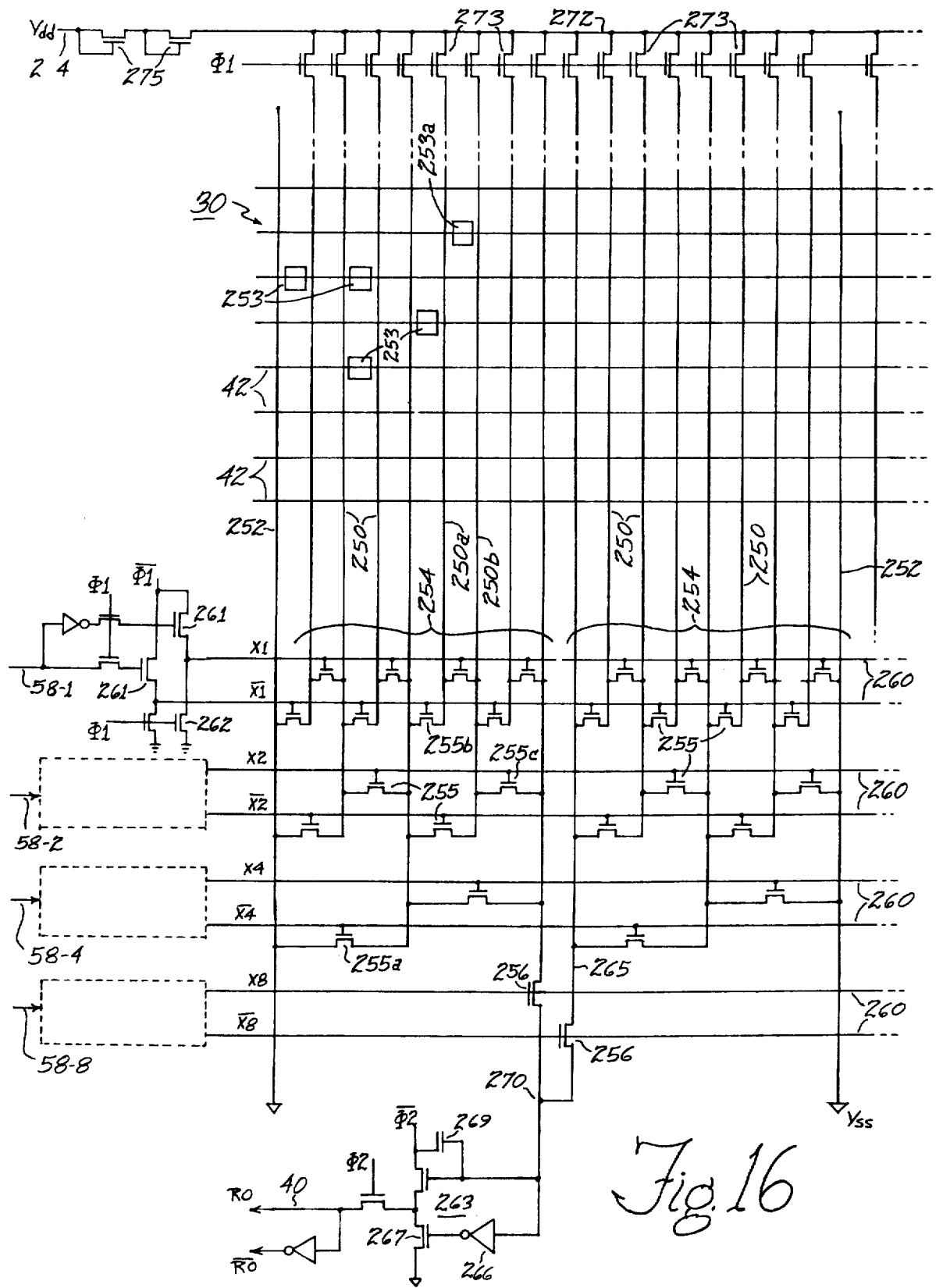

Referring to FIG. 16, the ROM 30 and the ROM page decoder 57 are shown. The ROM consists of an array of X lines 250 which are elongated P-diffusions in the semiconductor substrate, and Y lines 42 which are metal strips over a field oxide coating on the substrate, made in conventional manner. One hundred twenty-eight of the Y lines are provided in the array, although only a few are seen in FIG. 16, and one hundred forty-four X lines 250. The ROM is of the virtual ground type, and so only one ground line 252 is needed for each eight X lines 250; interior ground lines are shared with adjacent groups, so actually only ten ground lines are needed rather than eighteen. Virtual ground ROM's are disclosed in U.S. Pat. No. 4,021,781, issued May 3, 1977, filed Nov. 19, 1974, by Edward R. Caudel, in U.S. Pat. No. 3,934,233, issued Jan. 20, 1976 to Roger J. Fisher and G. R. Rogers, and in U.S. Pat. No. 3,916,169, issued Sept. 13, 1975 to Michael J. Cochran and Charles P. Grant, all assigned to Texas Instruments. A data bit is formed between adjacent ones of the lines 250, or between a line 250 and a ground line 252, by means of thin oxide areas 253 as set forth in U.S. Pat. No. 3,541,543, assigned to Texas Instruments. A pattern of the thin oxide areas 253 defined the "1" or "0" stored for each data bit, as they will each define the presence or absence of an MOS transistor. The ROM contains 18432 such data bit locations or potential locations for the thin oxide areas 253, the pattern defining the ROM code and thus the operation of the calculator. The locations are organized as 2048 instruction words containing nine bits each. The nine bits exit from the ROM on nine lines 40 (only one of which is shown in FIG. 16) which correspond to bits R0 to R8 of the instruction word, and the complement bits $\overline{R0}$ to $\overline{R8}$ are generated by inverters. The 2048 words are divided into sixteen groups or pages of one-hundred-twenty-eight words each.

The page decoder consists of eighteen arrays 254 of transistors 255. Only two arrays 254 are shown, but there are eighteen exactly alike. Each array contains only fourteen transistors 255, and one transistor 256, as explained in U.S. Pat. No. 4,021,781. The decoder receives the four bit ROM page address on four lines 58-1 to 58-8, from the ROM page address register 59 of FIG. 7a. Four input/precharge circuits 257, all alike, receive the ROM page address bits clocked in on $\phi 1$ by devices 258, inverters 259 providing for true and complement. Eight address lines 260 run the entire width of the ROM, through all sixteen of the arrays 254. These lines 250 provide X1, $\overline{X1}$, X2, $\overline{X2}$, X4 and $\overline{X4}$ inputs to the gates of transistors 255, and X8 and $\overline{X8}$ inputs to the gates of transistors 256. The selected lines 260 are charged on $\overline{\phi 1}$ via devices 261 and grounded on $\phi 1$ by transistors 262. An output circuit 263 connects each of the pairs of arrays 254 to one of the lines 40, so there are nine of the circuits 263, all alike. Adjacent arrays 254 each have output lines 264 and 265, which are also X lines 250 in the ROM array; the X8, $\overline{X8}$ address bit selects only one of these output lines via transistors 256. The selected one is connected to the input of an inverter 266, to ground the output line 40 via a device 267 if the selected one of the lines 264 or 265 is at Vss when $\overline{\phi 1}$ occurs, or to connect the output line 40 to $-$Vdd (through $\overline{\phi 1}$) via device 268 if the selected one of the lines 264 or 265 is at $-$V when $\overline{\phi 1}$ occurs. A gated capacitor 269 serves to bootstrap the output to a full logic level. The page address selects one of eight lines 250 in each group of eight by the transistors 255 in each array 254; the 1, 2 and 4 bits, i.e., X1, $\overline{X1}$, X2, $\overline{X2}$, X4, $\overline{X4}$ lines, are actuated in a pattern which connects one X line 250 to ground line 252 and the next adjacent X line 250 to line 264 or 265. For example, a ROM page address of 1010 (listed X1, X2, X4, X8) connects line 250a to ground line 252 via devices 255a and 255b, and connects line 250b to output line 264 via device 255c, while the device 256 on the X8 line connects line 264 to the node 270 and thus to the output. Any thin oxide gate 253a between lines 250a and 250b will thus be determinative, for the particular Y line 42 selected by the Y decode 44 to be later described.

The X lines 250 of ROM are precharged by connecting to a common line 272 by devices 273 which are clocked on $\phi 1$. The common line 272 is connected to the $-$Vdd supply 274 by two enhancement mode MOS transistors 275, so that the line 262 charges to $-$(Vdd$-$2 Vt), where Vt is a threshold voltage. For this example, Vdd is $-$9 volts and Vt is about 1.3 volts. So, the lines 250 charge toward a lower voltage of about $-$6.4 v., meaning that the lines will be precharged fast and will discharge fast, compared to the performance if the lines are precharged to $-$Vdd.

The ROM/RAM Word Decoder

Figure 17:
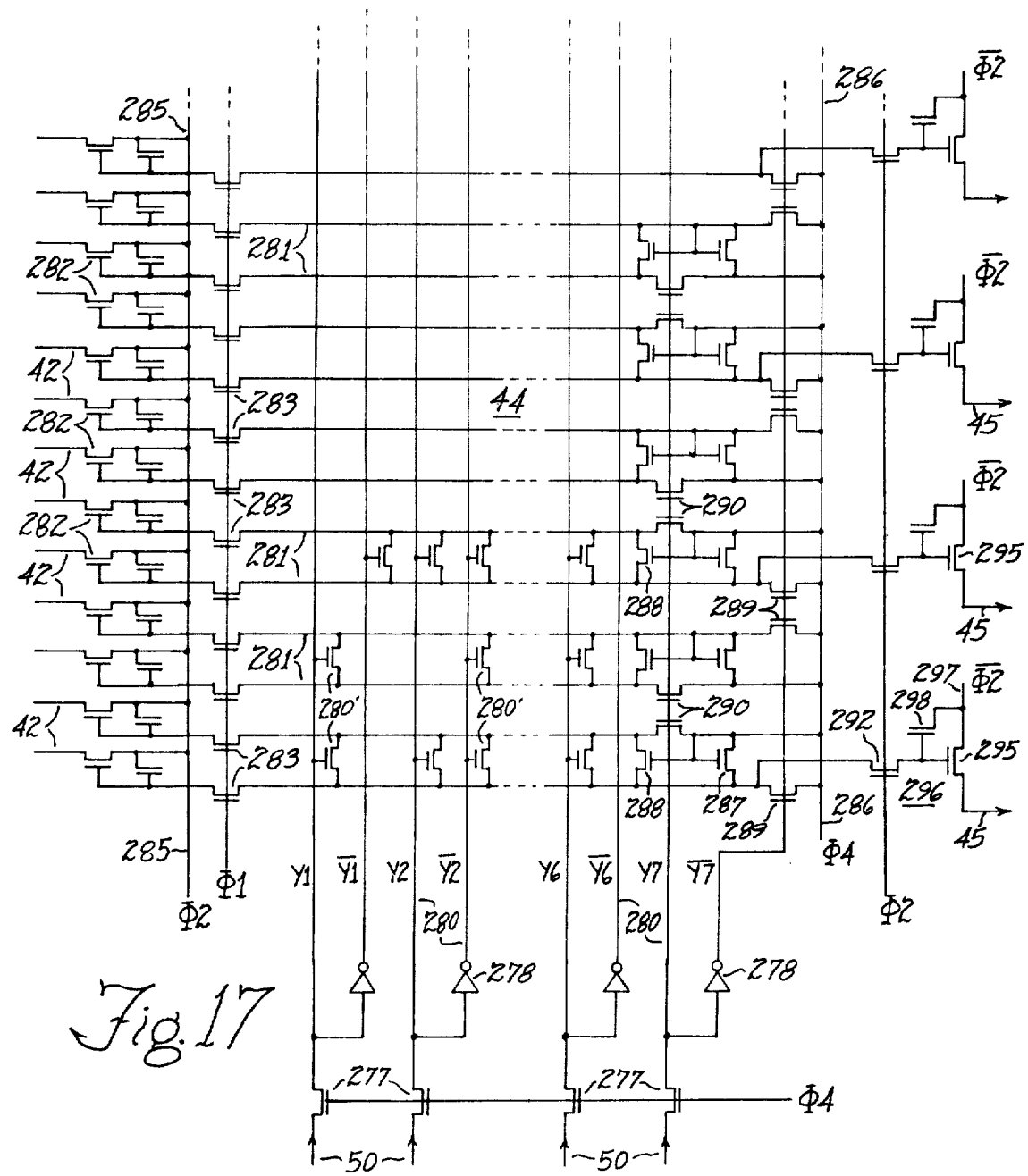

Referring to FIG. 17, the combined word or Y decoder 44 for the ROM 30 and instruction word decoder for ALU control decoder 46 are shown in detail. The decoder 44 receives a seven bit address on lines 50, and selects one of one-hundred-twenty-eight output lines 42 for the ROM or one of sixty-four lines 45 for the decoder 46. The lines 42 are the metal strips or Y lines in the ROM 31. The lines 50 receive a seven bit ROM address on $\phi 1$ or an instruction word to be decoded on $\phi$sel, both from the select circuit 51. During every machine cycle, a ROM address is delivered to the decoder 44 on $\phi 1$ and an instruction code on $\phi$sel, each during $\phi 4$ as determined by devices 277. With inverters 278, trues and complements are provided to the decoder on fourteen lines 280 which are metal strips, overlying P-diffused lines 281, to form an array similar to a ROM. This oxide areas are provided in selected bit positions under the lines 280 to create MOS transistors between adjacent ones of the lines 281. A given seven-bit code on the lines 50 selects one out of one-hundred-twenty-eight of the lines 281. All of the lines 281 are connected to the gates of devices 282 on $\phi 1$ via devices 283. Gated capacitors 284 serve to bootstrap the gate voltage on 282 to a higher level. The lines 251 are all at ground until one is driven negative during $\overline{\phi 1}$ from a line 285, due to one of the transistors 282 having had its gate driven negative during $\phi 1$. The lines 281 are charged to $-$Vdd by $\phi 4$ twice during each machine cycle; $\phi 4$ is applied to lines 281 from a line 286 via devices 287 and 288. During $\phi 4$ ($\phi 1$), all of the lines 281 and gates of devices 282 charge to $-$V from $\phi 4$ and some of the lines 280 go to $-$V as determined by the input 50, then during the last half of $\phi 1$, $\phi 4$ goes to ground and all but one of the lines 281 and gates of devices 282 discharge back to ground, depending on the pattern of thin oxide areas connecting lines 281 together and depending on which ones of the lines 280 are negative. Devices 289 and 290 select alternate paths for discharging of the lines 281; these devices 289 and 290 are gated by the MSD and its complement, so one will always be on and the other off, during $\phi 4$. The lines 281 also charge to $-$V from $\phi 4$ during $\phi 4$ ($\phi$sel), and some of the lines 280 go to $-$V, then after $\phi 4$ ($\phi$sel) ends all but one of the lines 281 discharge into the $\phi 4$ clock source which is at ground or Vss at this point, depending upon the pattern of thin oxide and the binary code on the lines 50.

The output from the decoder 27 to the lines 26 occurs on $\phi 2$, via devices 292, through which sixty-four of the one-hundred-twenty-eight lines 281 are connected to gates 294 of devices 295 in sixty-four address output circuits 296. The selected decoder input line 45 is driven to $-$V during $\phi 2$ from line 297, by the device 295. A gated capacitor 298 assures a high negative level on selected line 45.

Generating the ROM Address

The ROM word and page addresses are generated in several alternative ways, employing the program counter 47, the subroutine register 54, the ROM page address register 59 and buffer 60, as well as the controls 61 and the ROM output itself on lines 40. These elements will now be described.

The Program Counter

Figure 18:
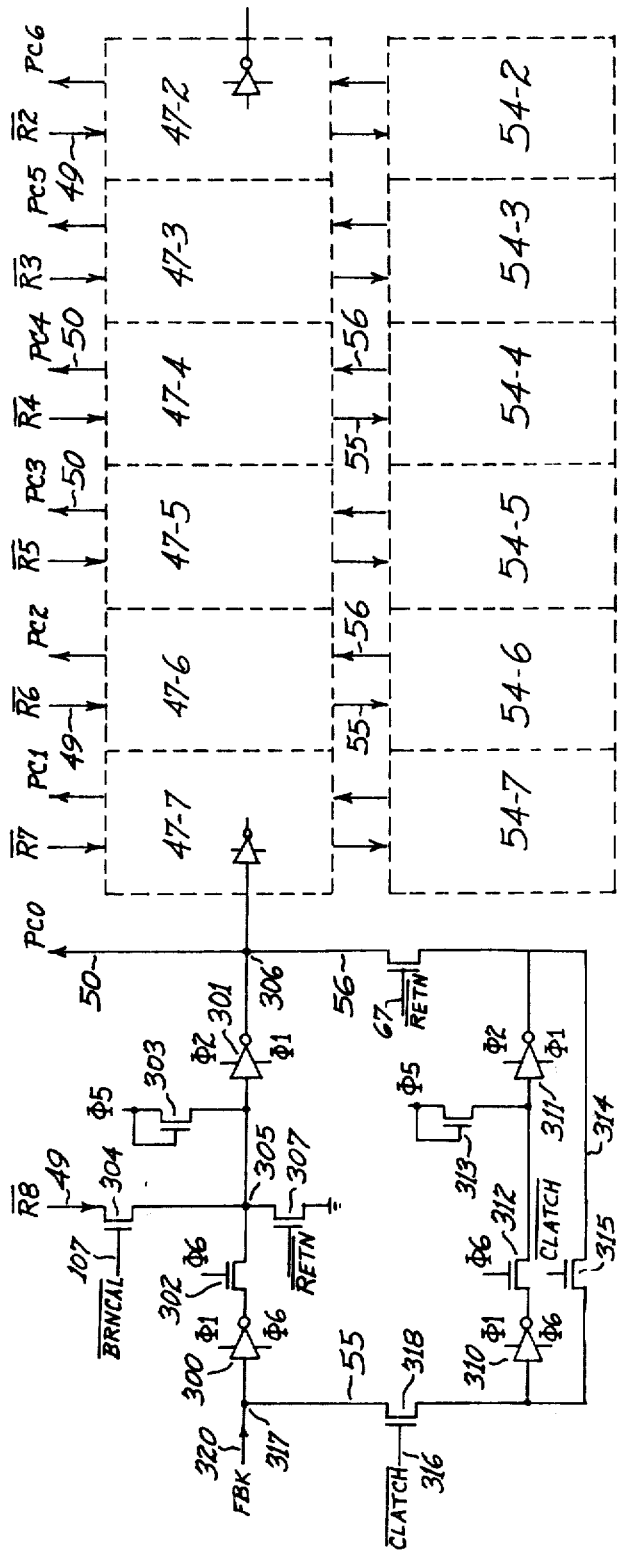

Referring now to FIG. 18, the program counter 47 includes nine stages 47-0 to 47-8, each of which is a register stage having two inverters 300 and 301. Each stage 300 is precharged on $\phi 1$ and conditionally discharged on $\phi 6$. Data is gated from the output of inverter 300 to the input of inverter 301 by a transistor 302 on $\phi 6$. The input of inverter 302 is charged to $-V$ at each $\phi 5$ by a device 303. Only seven stages of the program counter are used in the normal operation of the unit, these being stages 47-2 to 27-8 which receive the $\overline{R2}$ to $\overline{R8}$ ROM outputs from lines 40 via lines 49. The seven-bit address on $\overline{R2}$ to $\overline{R8}$ is gated into the stages 47-2 to 47-8 by devices 304 when the $\overline{BRNCAL}$ "branch or call" command on line 107 coming from the status circuit 104 is at $-Vdd$. This means that a successful branch or call operation is being performed, so the part of the instruction code on lines 40 which defines the branch address is loaded into the program counter 47 by the path just described.

The two extra stages 47-0 and 47-1 in the program counter, unused in regular operation, are employed for test purposes. All nine bits of the ROM output on lines 40, inverted and appearing as $\overline{R0}$ to $\overline{R8}$, may be loaded into all nine stages of the program counter under control of a $\overline{BRNCAL}$ signal on line 107, to appear on nodes 305, from whence for test the nine-bit word may be read out serially as described in U.S. Pat. No. 4,024,386, issued May 17, 1977 to E. R. Caudel, assigned to Texas Instruments.

The seven outputs from the program counter stages 47-2 to 47-8 to the ROM address decoder 44 are via seven lines 50-0 to 40-6, representing PC0 to PC6 signals. These are obtained at nodes 306 in each stage. Note that an address $\overline{R2}$ to $\overline{R8}$ on lines 49, when gated through devices 304 on $\overline{BRNCL}$ at $\phi 2$ ($\phi 4$) to nodes 305, passes through inverters 301 at the next $\phi 1$ to nodes 306 and to lines 50, valid on $\phi 1$.

A $\overline{RETN}$ command appearing on a line 67 from the output of the decoder 66 connects the node 305 to Vss through a transistor 307 in each stage. This occurs on $\phi 1$, and assures that data on the node 305 will not override the address from the subroutine register 54 coming in on $\phi 1$ via lines 56 to the nodes 306.

The Subroutine Register

In FIG. 18, the subroutine register 54 comprises seven identical stages 54-2 to 54-8 corresponding to program counter stages 47-2 to 47-8. Each subroutine register stage includes two inverters 310 and 311, and a transfer device 312, clocked just like the program counter stages. A device 313 connected to $\phi 5$ forces the input of the inverter 311 to $-V$ on $\phi 5$ of each cycle. A bit, once entered, will recirculate continuously via a feedback path 314 through a device 315 controlled by $\overline{CLATCH}$. When a "CLATCH" command is generated on a line 316 from the control 61, the contents of the program counter 47 as appearing on nodes 317 of each stage will be loaded into the respective stages of the subroutine register 54 via devices 318; this must occur on $\phi 2$. Normally, the control line 316 is at $-Vdd$, so the contents of the program counter are sampled into the subroutine register 54 via devices 318 on every machine cycle. But when a CALL is executed, the command is "don't load," so the last address is kept. The seven bits thus loaded into the subroutine register will thereafter continue to recirculate via devices 315 individually within the stages 54-2 to 54-8, until such time as a "RETN" command appears on a line 67 from the decoder 66. This causes device 319 to load the seven bits via lines 56 back into nodes 306 of the program counter stages 47-2 to 47-8, and thence immediately to output lines 50. At the same time, CLATCH goes negative so devices 316 thereafter load address bits into the subroutine register until another CALL mode is reached.

The Program Counter Feedback

Figure 19:
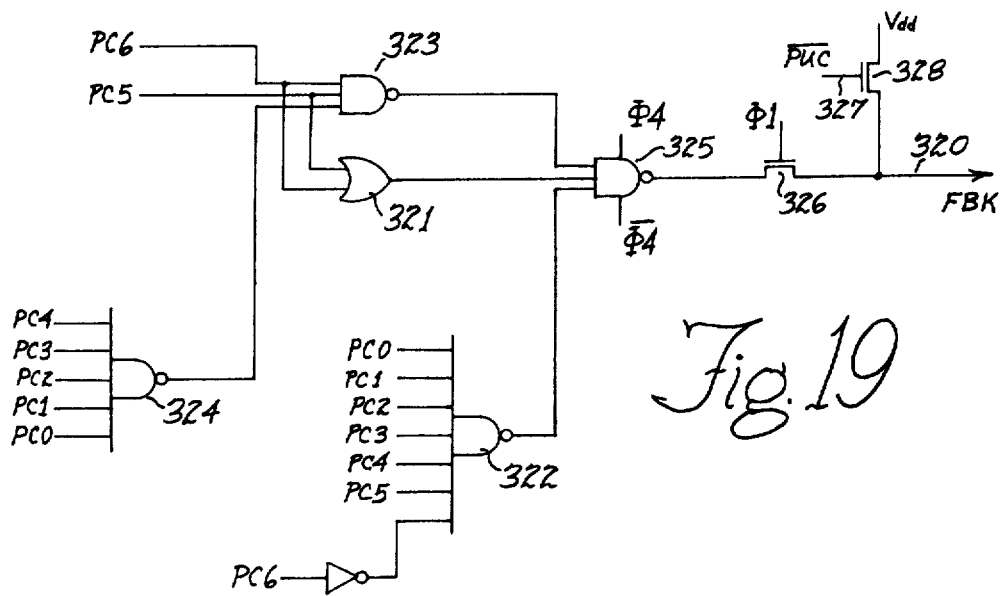

Referring to FIG. 19, the feedback circuit 48 for the program counter of FIG. 18 is illustrated. This logic arrangement examines the seven individual outputs PC0 to PC6 of the program counter 47 appearing on the lines 50 and determines whether a "1" or "0" is to be fed into the first stage 54-8 of the program counter via a line 320. An exclusive OR circuit 321 examines the PC6 and PC5 lines which are the outputs of the two MSD stages of the counter 47 used for ROM address, and generates an equivalence; if both are "0" or both "1", a "1" is fed back to input 320, and if they are different, then a "0" is fed back. This permits a count up to one-hundred-twenty-seven in a psuedo random manner, but some means must be provided to break out of a situation of all ones in the shift register 47. With all ones, the term fed back would be "1", and the counter would remain at all ones. To avoid this, the gate 322 is responsive to 0123456 and forces a count of 1111111, where the counter would be stuck, but AND gates 323 and 324 are together responsive to 0123456, forcing a "0" as the next feedback at the output of a gate 325. This arrangement causes the seven stage shift register to count to one-hundred-twenty-eight in a psuedo-random manner, i.e., in a set repetitive order but not in regular sequential order. The gate 325 is precharged on $\phi 4$ and conditionally discharged on $\overline{\phi 4}$. The outputs in the lines 50 are valid at $\phi 1$, and on $\phi 1$ a device 326 applies the computed feedback to the input 320. On power-up-clear, PUC on line 327 is at $-V$, and a device 328 applies all zeros to the input 320.

The ROM Page Address Register and Buffer

Figure 20:
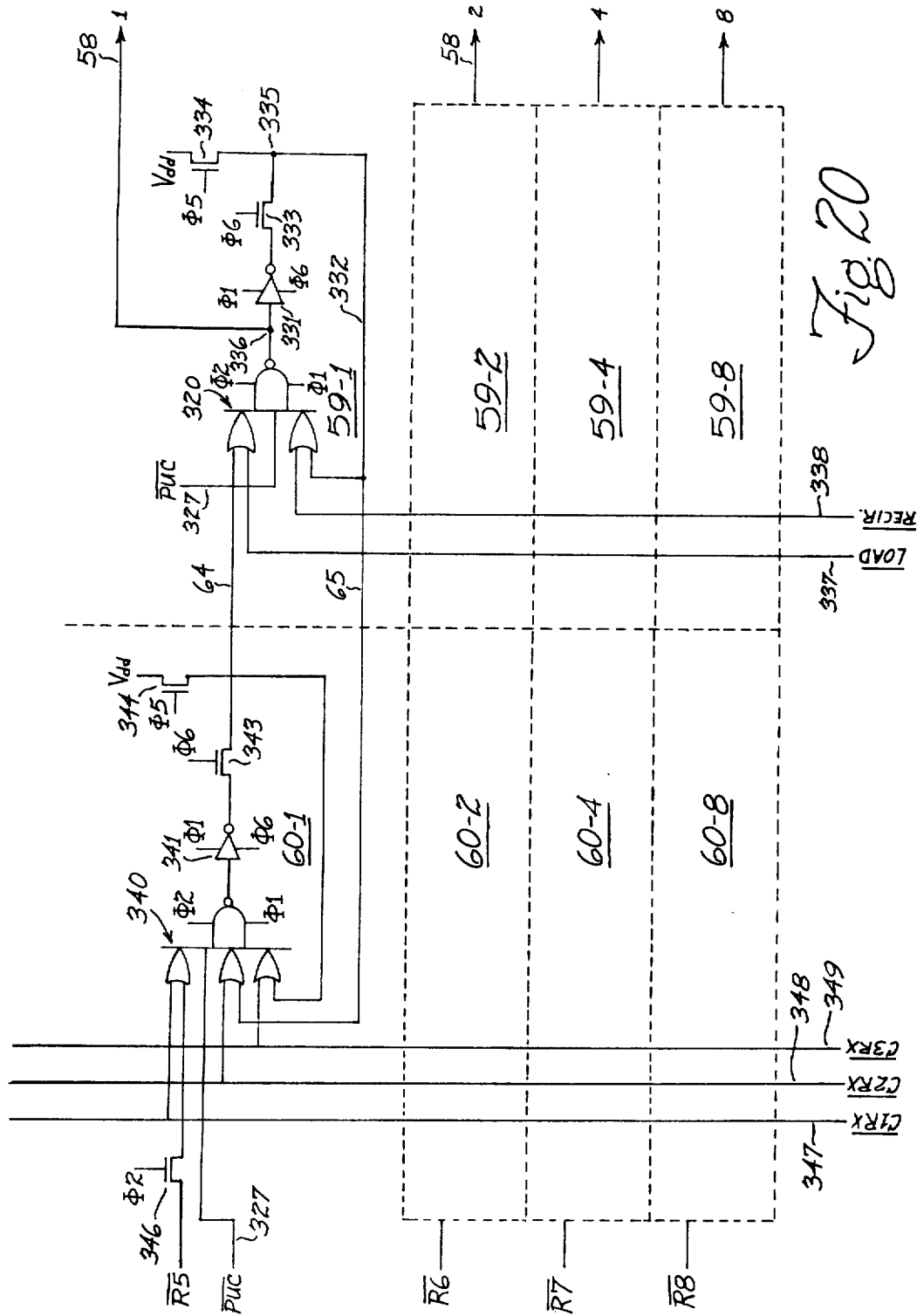

Referring to FIG. 20, the ROM page address register 59 comprises four stages 59-1, 59-2, 59-4 and 59-8, each of which includes a complex gate 330 and an inverter 331, along with a recirculate path 332, a transfer device 333 clocked at $\phi 6$ and a device 334 which connects a node 335 to $-Vdd$ or logic "0" on $\phi 5$. Output from the register 59 is via four lines 58-1, 58-2, 58-4 and 58-8 from nodes 336, going to the ROM page decode 57 for the ROM 30, valid during $\phi 1$. For power-up-clear, all of the nodes 336 may be connected to Vss due to a $\overline{PUC}$ command on the line 327 as an input to the gate 330. This produces a "0000" page address on lines 58. Input to the gates 330 can be from lines 64 which are outputs from the buffer register 60, when a $\overline{LOAD}$ command appears on a line 337 from control 61. Normally, however, the page address is recirculating via the path 332 and the gate 330 as a $\overline{\text{RECIR}}$ command will be on a line 338 from the control 61.

The buffer register 60 includes four register stages 60-1 to 60-8, each stage including a complex gate 340 which is precharged at $\phi2$ and conditionally discharged at $\phi1$, and an inverter 341, along with a recirculate path 342 and a transfer device 343 clocked at $\phi6$. As before, a power-up-clear command on the line 327 as an input to all four gates 340 will force all stages to Vss to clear the buffer register.

Inputs to the buffer register stages 60 via complex gates 340 may be from several sources. First the ROM outputs $\overline{R5}$, $\overline{R6}$, $\overline{R7}$, $\overline{R8}$ on lines 40 may be loaded into the buffer via devices 346 clocked on $\phi2$ when a $\overline{\text{C1RX}}$ command is produced on a line 347 from the controls 61 (occurring for a "load ROM page register" instruction), the $\overline{\text{C1RX}}$ input to the gates 340 also being gated in on $\phi2$. Second, the output from the ROM page address register 59, appearing on lines 65, will be the input to gates 340 when a $\overline{\text{C2RX}}$ command appears on a line 348 from the control 61, gated in on $\phi2$; this occurs for a CALL when status is at logic "1." Third, the buffer stages may be caused to recirculate upon themselves by paths 342 when a $\overline{\text{C3RX}}$ command appears on line 349 from the control 61; this occurs whenever $\overline{\text{C1RX}}$ or $\overline{\text{C2RX}}$ are both at Vss, i.e., the register 60 usually recirculates except when an address is being loaded from $\overline{R5}$–$\overline{R8}$, or a successful CALL is being implemented.

Generally, the register 59 and 60 contain the same data, meaning addresses are being used which are on the same "page" in the ROM. All the branches are within the same page. However, to go to a different page, i.e., a long branch, a new page address is loaded in from $\overline{R5}$ to $\overline{R8}$ to register 60. This results in the current address being in register 59 and on lines 58, and the new page address in register 60. If the branch is true or status condition satisfied, the register 60 is transferred to register 59 by a $\overline{\text{LOAD}}$ command on the line 337, and thus to lines 58. At this point, the same data is again in registers 59 and 60, so the machine is set up to do short branches again on the new page. If a CALL is executed, the register 60 is transferred to register 59, and vice versa, via lines 64 and 65. Of course, if the call is on the same page, the data is the same in each register anyway. But if it is a long call, to a different page, then the register 60 functions to store the address of the page existing at the time the CALL is initiated. So, when a return is executed, the register 60 is transferred to register 59, the two registers again have the same data, and the machine is at the initial address, set up for short branches.

The Address Controls

Figure 21:
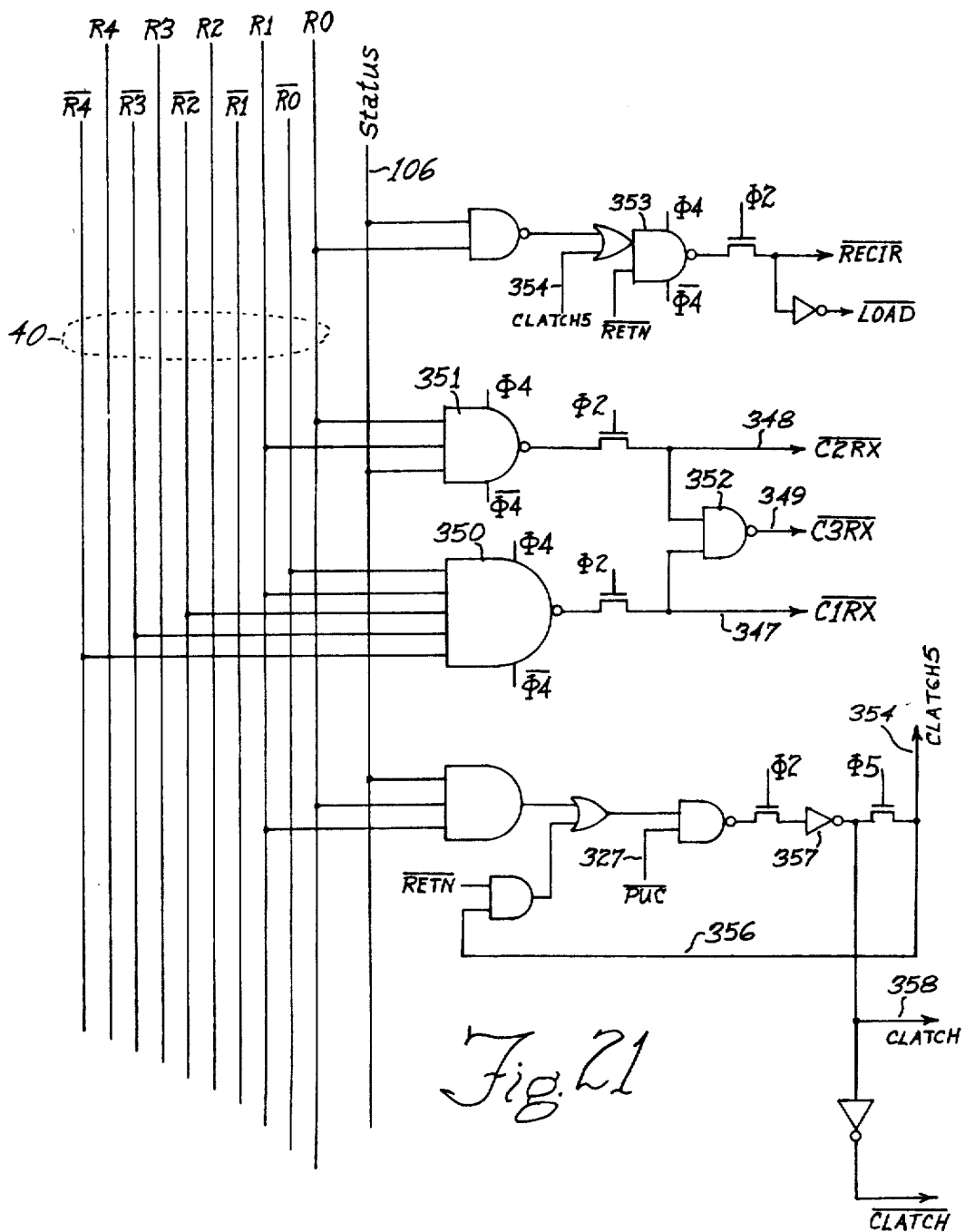

Referring to FIG. 21, the control 61 for the ROM addressing circuitry includes several separate gates for generating the various commands. A gate 350 produces the $\overline{\text{C1RX}}$ command on line 347 in response to the presence of $\overline{R0}$, $\overline{R1}$, $\overline{R2}$, $\overline{R3}$ and $\overline{R4}$ on the lines 40. This loads in a new page from $\overline{R5}$ to $\overline{R8}$ on lines 40 for a long branch or call. A gate 351 produces the $\overline{\text{C2RX}}$ command on the line 348, in response to the presence of R0 and R1 on lines 40, and a STAT signal on the line 106 from status logic 104; all these must be at Vss or logic "1" for $\overline{\text{C2RX}}$ to be at −Vdd. This means that a 11XXXXXXX instruction word is on lines 33 and status is at logic "1;" this is a CALL. A gate 352 produces the $\overline{\text{C3RX}}$ command on the line 349 in response to the C1RX and C2RX commands at the outputs of gates 351 and 352 both being at Vss. This says recirculate the register 60 via lines 352, i.e., save the address in the buffer register. A gate 353 produces the $\overline{\text{LOAD}}$ and $\overline{\text{RECIR}}$ commands on the lines 337 and 338 as a function of STAT on the line 106, R0 from the lines 40, the $\overline{\text{RETN}}$ signal on a line 67, and a CLATCH5 signal derived from CLATCH appearing on a line 354. Whenever a return is executed, $\overline{\text{LOAD}}$ should go to Vss, so the register 60 can be loaded into register 59 via the lines 64 and the gates 330. When $\overline{\text{LOAD}}$ is not present, $\overline{\text{RECIR}}$ is on the line 338.

The CLATCH command is produced from a complex gate 355 having a feedback path 356, which is responsive to STAT on the line 106, R0 and R1 from lines 40, $\overline{\text{RETN}}$ on a line 67, and the power-up-clear signal $\overline{\text{PUC}}$ on the line 327. One function of CLATCH circuitry is to disable the path 64 from the register 60 to the register 49 when a CALL is executed; this is done by a line 354 going to the gate 353, which is also responsive to R0 and status being at Vss. R0 and status being "1" are a successful branch or call, and would cause transfer of the register 60 to the register 49, but CLATCH says don't do it. CLATCH is normally in the non-CALL mode, saying that the machine is not calling but is branching. If R0, R1 and status are "1" into the gate 355, it means a valid CALL, so the latch is set into CALL mode. The $\overline{\text{RETN}}$ instruction says leave the CALL mode, and reset the latch. $\overline{\text{PUC}}$ also resets the latch. An inverter 357 and the gate 355 between input and output, and the feedback path 356 provide a latch function, so that when CLATCH is produced on a line 358 it will subsist until "return" $\overline{\text{RETN}}$ occurs.

The Control-Keyboard-Bit Logic

Figure 22:
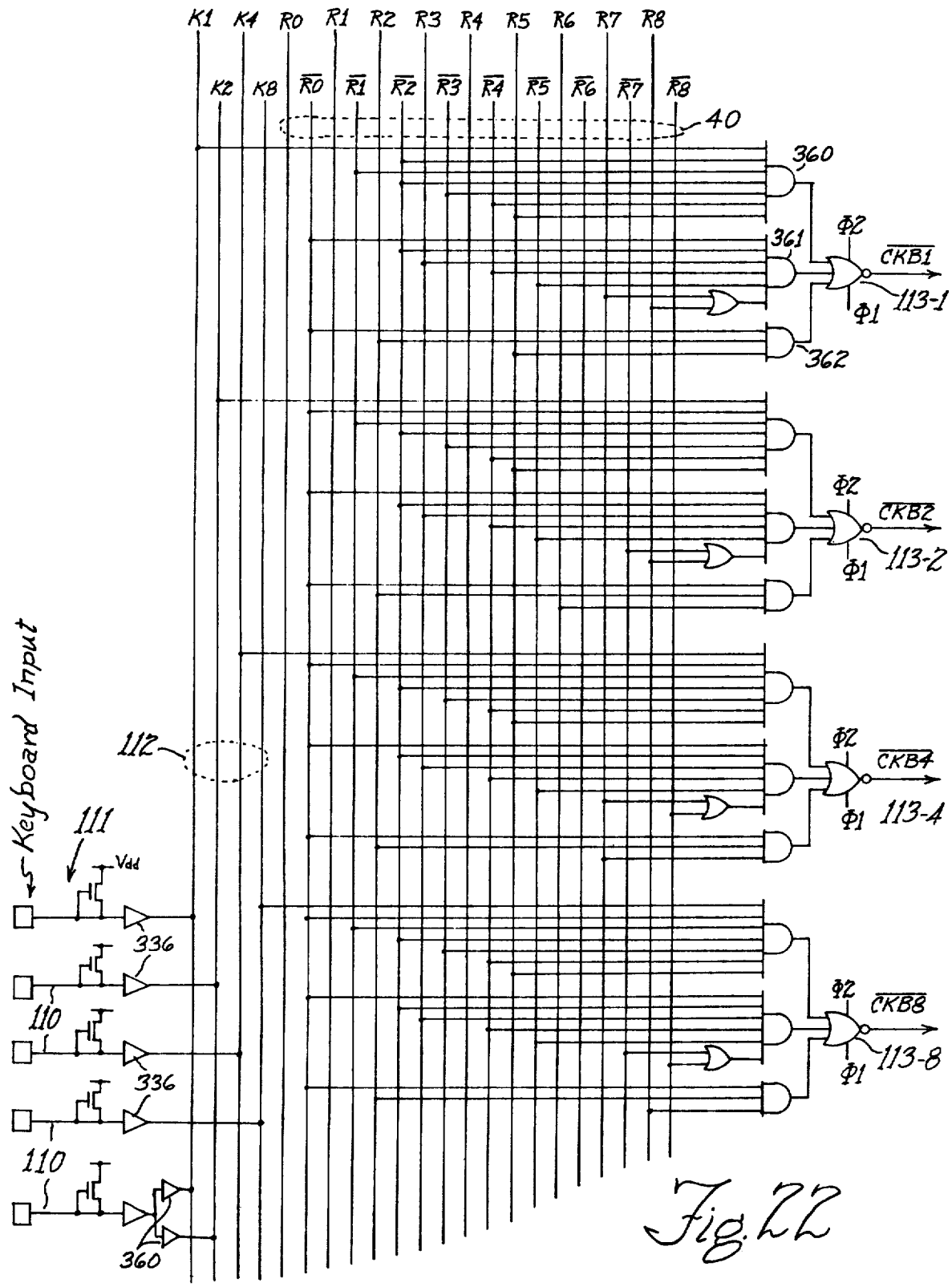

The CKB logic 113 shown in FIG. 22 consists of four identical complex gates 113-1, 113-2, 113-4 and 113-8 which produce the $\overline{\text{CKB1}}$ to $\overline{\text{CKB8}}$ outputs on lines 83-1 to 83-8. The CKB outputs 83 are applied to the adder input selectors 71 and 72, and to the RAM Write Control 38, as explained. Each of the four complex gates 113-1 to 113-8 contains three separate gating arrangements 360, 361 and 362, each of which will produce a CKB output under certain conditions, dependent upon the current instruction word on lines 40. The gating arrangements 360, in each case, receive $\overline{R0}$, $\overline{R1}$, $\overline{R2}$, $\overline{R3}$, $\overline{R4}$ and $\overline{R5}$ from the lines 40 into an AND gate, along with either K1, K2, K4 or K8 from the lines 112; this serves to place the keyboard or external data on the CKB lines 83, when the instruction word is 000001XXX. The gating arrangements 361 function in setting and resetting bits in the RAM 31, and receive $\overline{R0}$, $\overline{R2}$, $\overline{R3}$, $\overline{R4}$ and $\overline{R5}$ from the lines 40 into an AND gate, so this part will be responsive to an instruction word 00100XXXX, while the remaining OR part of each of the gates 211 is responsive to a selected two of the R7, $\overline{R7}$, R8 or $\overline{R8}$ lines so that only one of the four gates 113-1 to 113-8 will produce a CKB output. This serves to select one of the four bits for a bit operation. The gating arrangements 362 include an AND gate in each case, responsive to R0 and R2 from lines 40, along with either R5, R6, R7 or R8. Thus, gates 362 serve to place all four bits R5, R6, R7 and R8 on the CKB outputs 83 when the instruction code is 01XXXXXXX.

Figure 22A:
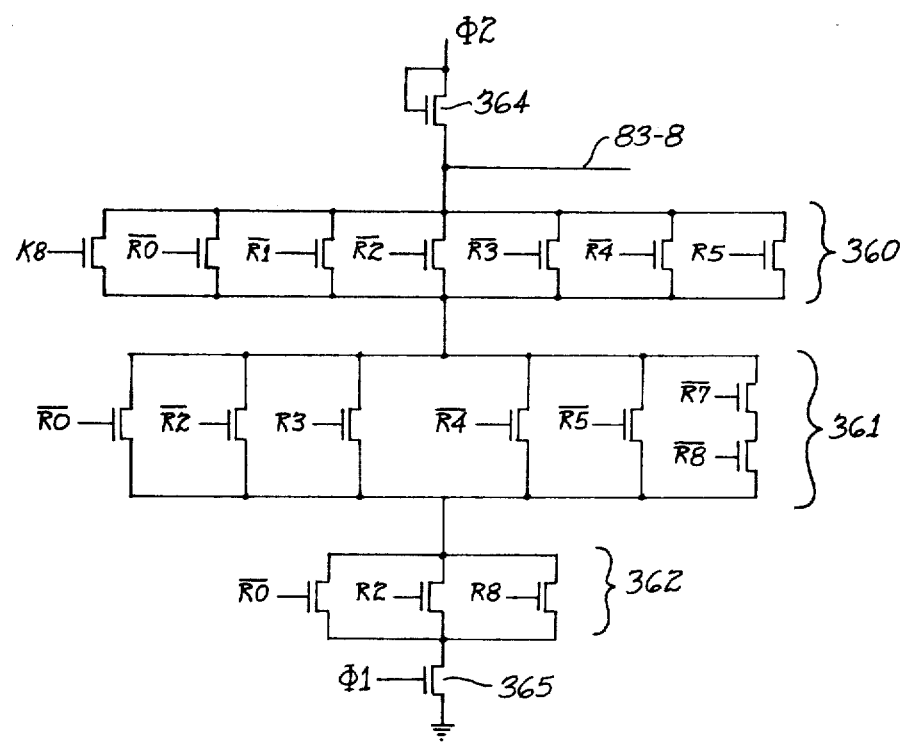
FIG. 22a is a detailed electrical diagram of one of the sets of gates 360, 361 and 362 in the CKB circuit of FIG. 22.

Referring to FIG. 22a, one of the complex gates is shown, this being the gate 113-8. The other gates 113-1, 113-2, 113-4 would be the same except for changes in certain inputs as shown in FIG. 22. On $\phi2$, the output line 83-8 is precharged to −Vdd through a device 364, then during $\phi1$ of the next cycle the ouput line 55-8 is conditionally discharged via the gate arrangements 360, 361 and 362, and a series device 365. It is seen that if the instruction code on the lines 40 is 00001XXXX, the gate 360 will be controlling because the gate 361 will be shorted by R3 while the gate 362 will be shorted by R2. Thus, for 00001XXXX, the four CKB gates 113-1 etc. will be controlled by the data on K1, K2, K4 and K8. In FIG. 22a K8 will determine whether line 83-8 is shorted to ground. If the instruction on lines 40 is 00100XXXX, the gate 361 is controlling because the gate 360 is shorted by R3 and the gate 362 is shorted by R2, so $\overline{R7}$ and $\overline{R8}$ will determine discharge of the line 83-8. The gate 262 controls if the code is 01XXXXXXX, because the gates 360 and 361 are shorted by R2.

The overall function of the CKB logic 113 is thus seen to be threefold. First, a four-bit constant appearing in the R5 to R8 field of the instruction code may be applied to the lines 83. Second, the keyboard or external inputs on the lines 112 may be applied to the lines 83. Third, one of the four lines 83 may be selected, as for addressing one of four bits of a digit in the RAM 31. All of these functions are under control of the current instruction word on the lines 40.

The Keyboard Input

Also shown in FIG. 22 is the keyboard input circuit 111 which generates the input on the lines 112 from the inputs 110 or 26. Schmidt trigger circuits 366 are used between the lines 110 and the lines 112 to impose a threshold and hysteresis effect. While referred to as a keyboard input, and used as such for calculators, it is understood that BCD or binary data may be entered directly into the lines 26 from any source when the digital processor chip of the invention is used for other purposes. Note that true data is a "1" or Vss level, and at other times the lines 26 and 110 and thus lines 112 will be held at "0" or Vdd by depletion load devices 367.

The K3 input generates a "0011" on the lines 112 by a pair of connections 368 connected to the K1 and K2 lines via isolating inverters.

Generally, in using the processor chip as a calculator, numbers are not entered via the keyboard inputs in the form of numerical data; that is, when a "7" key is depressed, a BCD "7" or 0111 is not generated on the K lines, but instead typically a sequence of programming steps is employed to detect that a key is down, then to store the K line information in the RAM 31 while the identity of the segment line 27 which is actuated is stored in the accumulator 77. This data may then be used to identify the key by software and enter a BCD number in the RAM 31 or execute an mathematical operation.

An advantage of this input system, as set forth in U.S. Pat. No. 4,021,656, issued May 3, 1977, filed Nov. 19, 1974, by Caudel and Raymond, assigned to Texas Instruments, is that numbers and operations may be intermixed on the K lines, and the numbers need not be in numerical order. Also, two keys might be pushed at the same time, and one may be rejected by software. Further, fixed switches as for DPT position may be intermixed with momentary switches.

The keyboard inputs go to the CKB logic 113 only. From there, the keyboard can be loaded into the RAM, the accumulator 77 or the Y register 76.

The Selector for ROM Word Address and Instruction Decode

The selector 51 is illustrated in detail in FIG. 23, where the seven lines 53 at the output of the program counter 47 representing PC0 to PC6, are shown connected to the seven lines 50 at points 370. Transistors 371 clocked on $\phi 1$ cause the ROM word address in the program counter 47 to be gated onto the lines 50 at $\phi 1$ of each cycle. Transistors 372 clocked on $\phi 3$ cause the lines 50 to be forced to logic "0" or $-$Vdd at $\phi 3$ of each cycle.

The six bits R3 to R8 of the instruction word on the lines 40 are connected by lines 373 and series transistors 374 and 375 to the lines 50. The transistors 375 are clocked on $\phi$sel, which starts after $\phi 1$ and ends before $\phi 3$, as seen in FIG. 8. Thus, during $\phi$sel of each cycle, R3 to R8 may be applied to the lines 50 and thus to the decoder 44, where one of the lines 45 is selected based on R3 to R8. This occurs when the transistors 374 are turned on by a gate 376 which receives $\overline{R0}$, $\overline{R1}$ and $\overline{R2}$; if these are all at logic "1" (an instruction code of 000XXXXXX) then the output of the gate will be at $-$V and the transistors 374 are on. So, any instruction word containing 000 in the R1, R2, R3 positions will be transferred to the decoder 44 and the control decoder 46. Only six bits are needed to select one of sixty-four of the lines 45, so one bit 377 is held at $-$Vdd by a device 378.

When one of the bits R0, R1 or R2 is a "1," the output of the gate 376 is at Vss and the transistors 374 will be off, while a set of transistors 380 will be turned on due to an inverter 381. This allows an instruction code on six lines 382 to be applied to the lines 383 going out to the lines 50 on $\phi$sel. Thus, an instruction can be "faked" to appear as if it had a 000XXXXXX code. These faked codes are generated in an encoding section 384 which is part of a PLA having a decoder section 385. The section 385 selects one of eight of the lines 386 depending on the code on the bits R0 to R4 and their complements appearing on the lines 40. A $\overline{TCY}$ instruction is to transfer a constant in bits R5 to R8 to the Y register and it has a code 00100XXXX on the true lines 40. The "1" in the R2 bit causes the gate 376 to turn off the transistors 374 and turn on the transistors 380. The $\overline{TCY}$ line in the lines 386 will be actuated, and the coding of the section in 384 will generate a faked code of 111000 on the R3 to R8 bits, regardless of what the actual R3 to R8 bits are in the TCY instruction. This system permits the constant operations to generate microcodes from the decoder 46 which uses some of the same bits as the constant field.

The Branch Latch Operation

Another function of the circuitry of FIG. 23 is to implement the "branch latch" operation, wherein a branch instruction can perform operations during the same instruction cycle. The output BL of the branch latch 122 on the line 123 is at logic "1" or Vss for branch latch operations, causing the output of the gate 376 to be at $-$Vdd in spite of the fact that $\overline{R0}$ will be at $-$Vdd. This allows the R3 to R8 bits on the lines 373 to pass through to the lines 50 and produce outputs from the control decoder 46.

The branch latch circuit 122 in FIG. 23 comprises a latch which has a gate 388 having one input connected to receive a RETN command from a $\overline{RETN}$ decoder 389, through an inverter, and another input connected to receive a "set branch latch" or $\overline{SBL}$ command on a decoder line 390, both of these being gated in on $\phi 2$. The output of the gate 388 at a node 391 is the BL or "branch latch" command on the line 123. Another gate 392 receives the BL signal and also the $\overline{PUC}$ command on the line 327, and produces an output on a feedback path 393, providing the latch function. The branch latch is unconditionally set by an $\overline{SBL}$ command, i.e., by an instruction word, and remains set until an $\overline{RTN}$ is decoded, i.e., by another instruction word. Power-up clear resets the branch latch.

The instruction decoder 66 is also illustrated in FIG. 23, where each of the fixed operation instructions is generated on one of the lines 67 which have gates 394 in a pattern fixed to be responsive to a given instruction word on the lines 40. Each line has a depletion load 395 connected to it so it functions as a NAND gate.

The Add Latch

The add latch, shown in FIG. 23, employs two cross-coupled NAND gates 396 which are responsive to $\overline{SAL}$ and $\overline{RETN}$ commands on a line 397 and the line 389. The add latch is unconditionally set by a "set add latch" instruction which produces the $\overline{SAL}$ command on the decoder line 397, and is reset by the $\overline{RETN}$ command which also resets the branch latch and terminates a subroutine. The outputs from the add latch, ADD and $\overline{ADD}$, are used in the special status circuit 100 as described.

The Instruction Decoder

Figure 24:
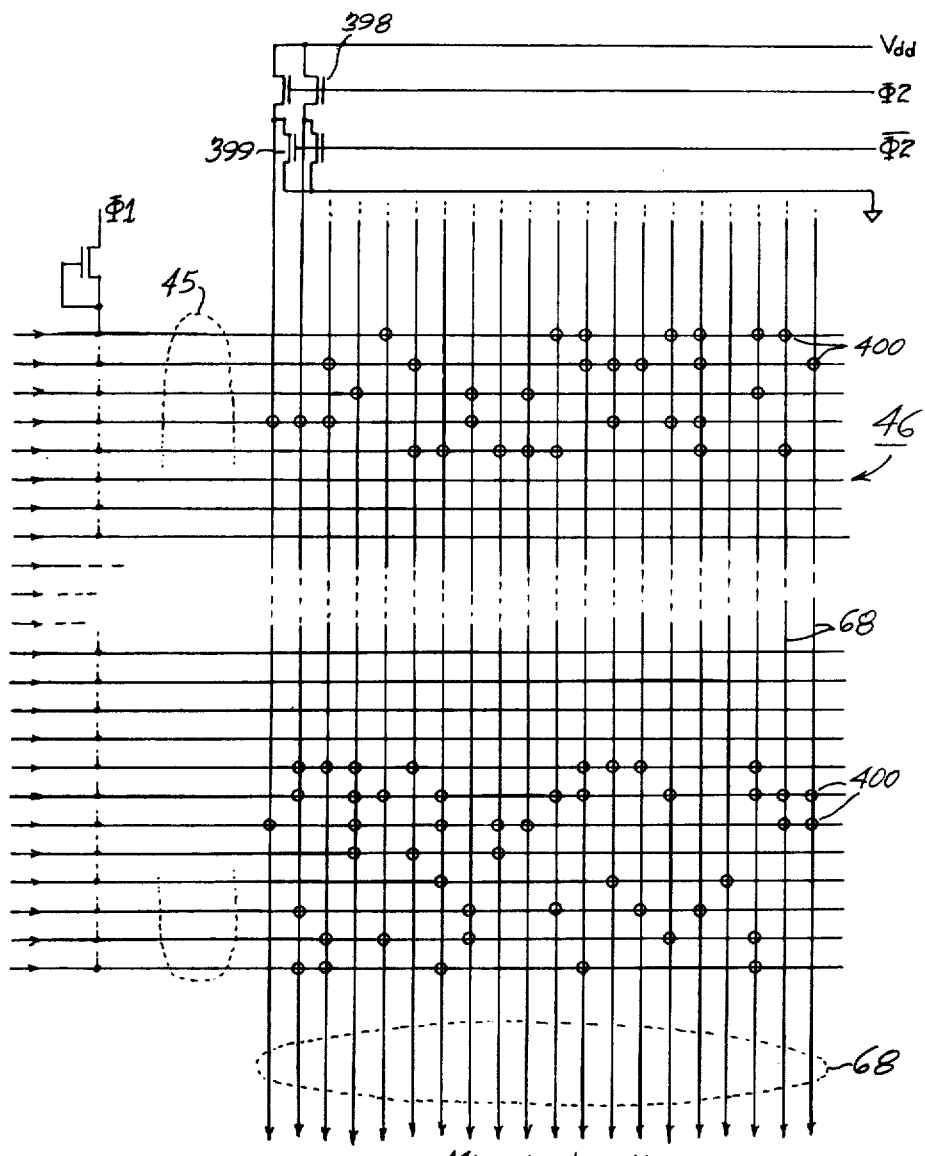

In FIG. 24 the ALU control decoder 46 is illustrated. This decoder receives via lines 45 a one-of-sixty-four decode from decoder 44 of the six-bits of the instruction words conveyed on the lines 50 from the selector 51 of FIG. 23. The actuation of the selected line 45 is valid at $\phi 2$ due to the output stage 296 shown in FIG. 17. The sixty-four lines 45 are metal stripes in the decoder 46, extending across twenty columns of potential MOS transistors including elongated P-diffusions which make up the output lines 68 on which the microcodes appear. The lines 68 are precharged on $\phi 2$ by twenty transistors 398, then discharged on $\phi 1$ by transistors 399. A pattern of gates 400 or thin oxide areas, represented by circles, connect the P-diffusion lines 68 to interleaved P-diffused Vss lines, not shown, and thus from MOS transistors at each circle. Each line 68 therefore functions to produce a Vss or "1" output if any line 45, which crosses it and has a circle or gate over it, is activated (at −Vdd); otherwise, each line 68 will be at −Vdd during the period between the end of $\phi 1$ and the beginning of $\phi 2$ (i.e., $\overline{\phi 2}$ except for $\phi 1$). The decoder 46 produces all of the twenty microcodes set forth in Table I.

Add and Subtract Operations Using Special Status and Branch Latch

Figure 25:
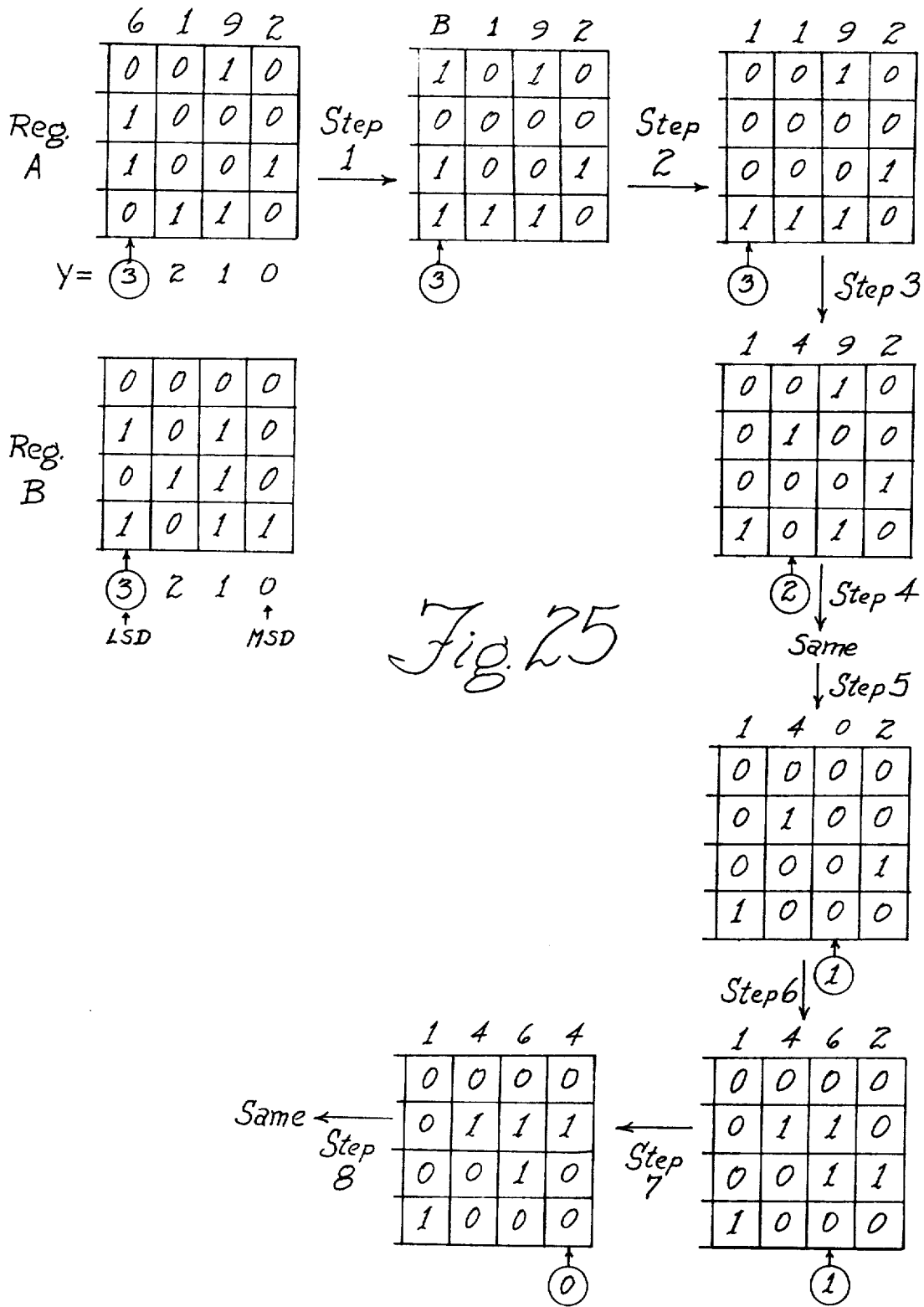
FIGS. 25 and 26 are representations of the contents of parts of the RAM 31 in successive steps in implementing addition and subtraction routines.

Referring to FIG. 25, an example of an addition operation is shown wherein a number "2916" in one of the RAM lines 0-7, labelled here Reg A, is added to a number "37 1725" in the DAM, labelled here Reg B, and the result is stored in Reg A. The MSD of the number is stored at Y=0 and the LSD at Y=3; for example. If numerical data is stored as ten-digit numbers, the files would contain data in Y=0 through Y=9. To add the number "2916" to "1725", first the LSD's are addressed, in this case with Y=3, i.e., Y register 76 containing a three. The first step is to subject the numbers "6" and "5" at Y=3 in Reg A and Reg B to a binary add, resulting in a hex "B" or 1011 (with no carry), and this hex B is stored in Reg A at Y=3 as shown. Next, in Step 2, a "6" is added to the result of Step 1, and if a carry is generated the digit at Y=3 in Reg A is modified, i.e., the sum is written over what was in this digit of Reg A. The addition of "B+6" in hex generates a carry and produces a sum of "1," so Step 2 shows Reg A modified to contain "1" in the Y=3 digit. The Y register is decremented for Step 3, so Y=2 is operated on; the "1" from Reg A is added to the "2" from this digit position of Reg B, and a carry is added in for this step if either Step 1 or Step 2 generated a carry. In this example, Step 2 generated a carry, so the result of Step 3 is a "4" in the Y=2 position of Reg A (1+2+1). Again, a "6" is added for BCD connection, in Step 4, but this does not generate a carry (4+6=A, in hex; where A is 1010) so there is no change in Reg A. The modify write step fails because no carry was generated. For Step 5, Y is decremented again, and so Y=1 is operated on. Here the numbers "9" and "7" are added, producing a sum of "0" and a carry, since 1001 plus 0111 results in 10000. In Step 6, a "6" is added to the sum produced by the Step 5 addition (this sum is still in the accumulator) and the result modifies or replaces number in the Y=1 position of Reg A because Step 5 generated a carry. In Step 7, Y is decremented so the "0" position is addressed, and addition of these two numbers (plus a carry because Step 5 generated a carry) produces a result of "4," and this number is written into the "0" position of Reg A. In Step 8, a modify write is attempted, but fails because there is no carry when a "6" is added. Thus the final result is in Reg A as it was after Step 7. The sum of 2916 plus 1725 is 4641.

Figure 26:
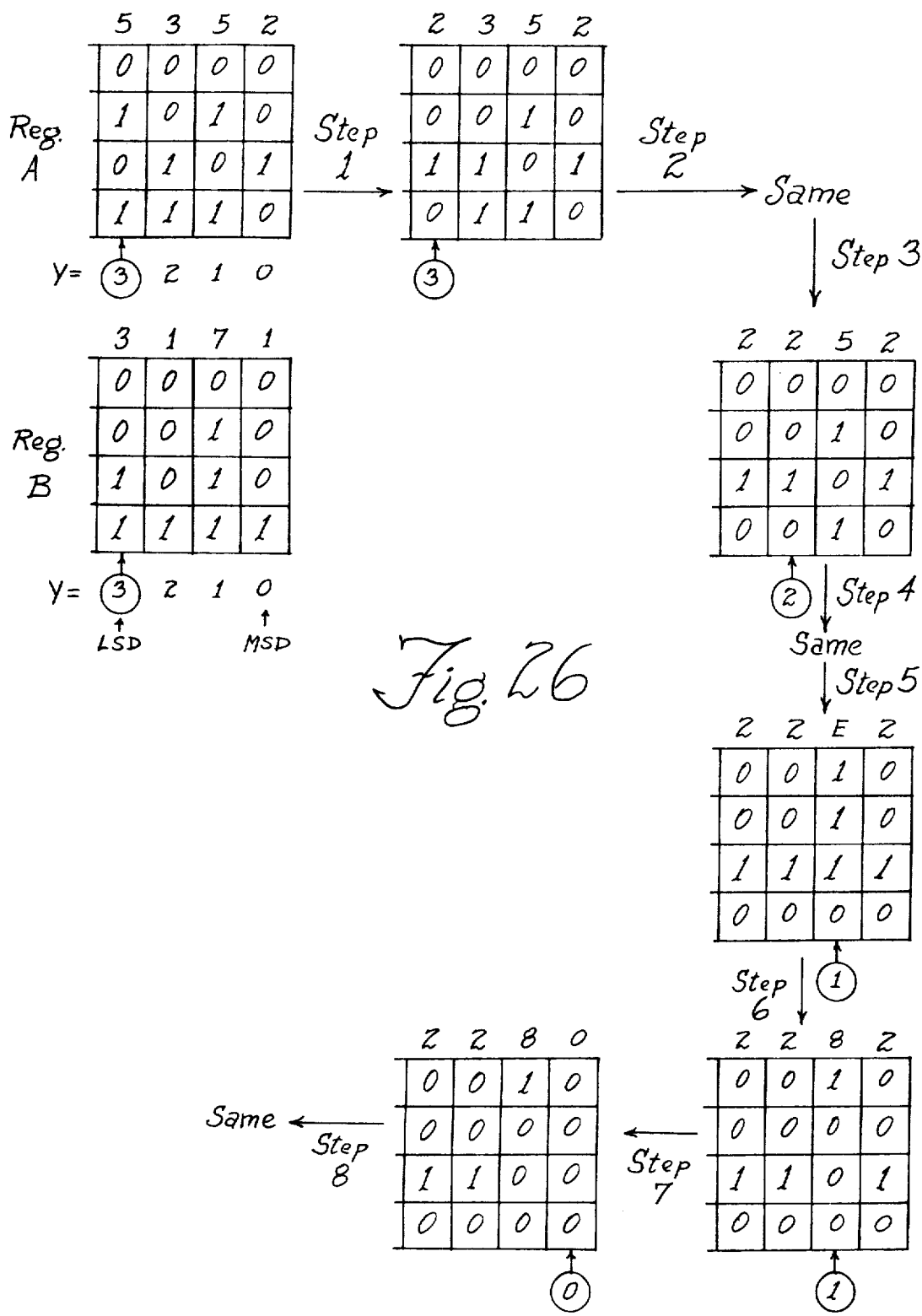

An example of subtraction using two's complement addition, with BCD correction, is shown in FIG. 26, where again a number 2535 in one of the files 0-7, here called Reg A, is to have a number 1713 in the DAM or Reg B subtracted from it. In Step 1, three is subtracted from five, but this takes the form of complementing the three (0011) producing a hex C (1100) and adding one, the sum of which is hex 2 and a carry, and this 2 is written into Reg A, position 3. In Step 2, the BCD correction in this case is to add a hex A to and modify if a carry is generated or if Step 1 produced no carry. 2+A=C, with no carry, so no change results. In Step 3, Y is decremented to the 2 position, and "1" is subtracted from "3" by complementing the "1" to produce a hex E and adding one, the sum of which (3+E+1) is "2" and a carry. The "2" is written into Y=2 position of Reg A. In Step 4, a hex A is added for BCD correction, again no carry so no change. In Step 5, Y is decremented, so the Y=1 position is addressed, where "7" is to be subtracted from "5." In 2's complement addition, this means "7" (0111) is complemented, producing "8" (1000), and one is added. The sum (5+8+1) is a hex E and no carry; E is written into Y=1 of Reg A. In Step 6, BCD correction is (E+A=8); there was no carry in Step 5, so the sum, "8," is used to modify a write into position Y=1 of Reg 8. In Step 7, the Y register is decremented, so Y=0, and "2" from Reg A is added to hex E (the complement of "1" from Reg B, Y=0) plus one. The result is zero plus a carry, and this zero is written into Reg A Y=0. In Step 8, BCD correction consists of adding hex A to the prior sum, "0", which produces hex A and no carry. Therefore the result remains the same. The result of (2535−1713) is 822.

Figure 27:
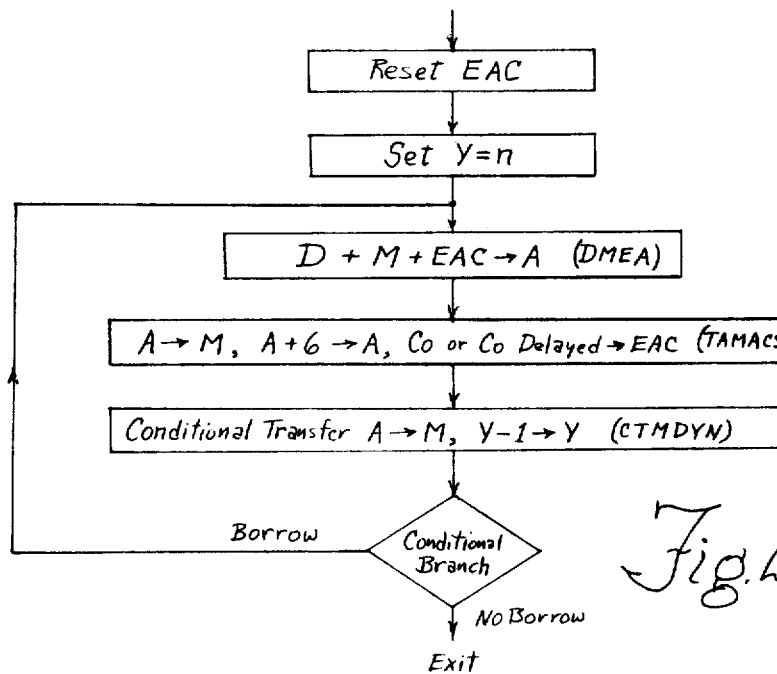
FIGS. 27 and 28 are logic flow charts for addition routines which may be used in the sytem herein described.

FIG. 27 shows how the instruction set provided by the system described can execute the add sequence just described with only four instructions in a loop. These instructions are DMEA, TAMACS, CTMDYN, and BRANCH. This represents efficient routine for doing add operations in a calculator. Add operations must be efficient because add is used in multiply and in doing series iterations. Calculating the sine of a number, for example, may require hundreds of addition steps because of the algorithms used. To avoid having execution times which are annoying long to the user, add operations must be done with greatest expediency.

Figure 28:
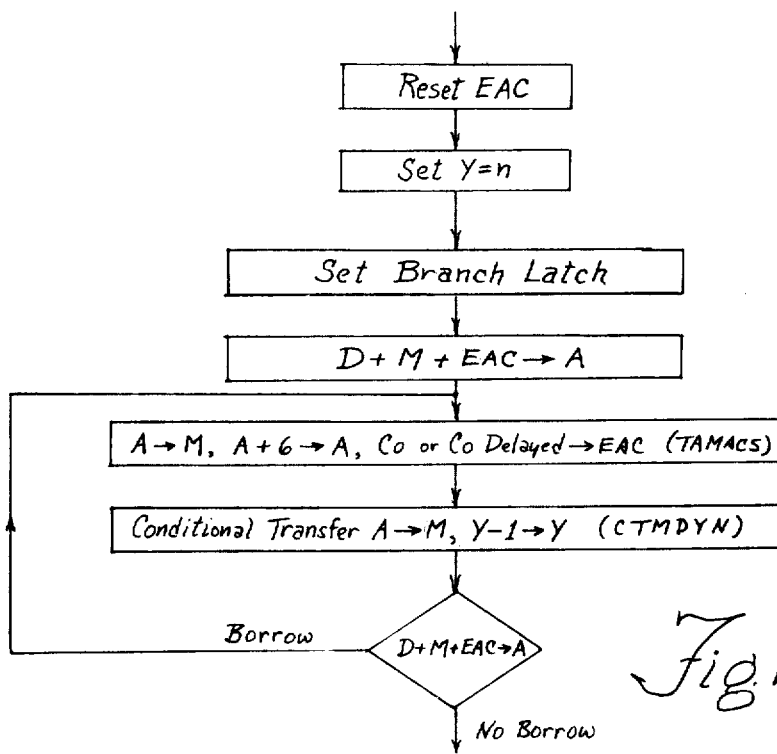

Further improvement is accomplished by employing the branch latch instruction, as seen in FIG. 28, where a three instruction loop is used. The DMEA instruction is chosen to have the same R3 to R8 bits as the branch address, so when the branch latch is set the gate 376 of FIG. 23 causes the code on R3 to R8 to pass through and be decoded in decoder 46 while a branch is being set up at this same instruction cycle.

The Semiconductor Chip

Figure 29:
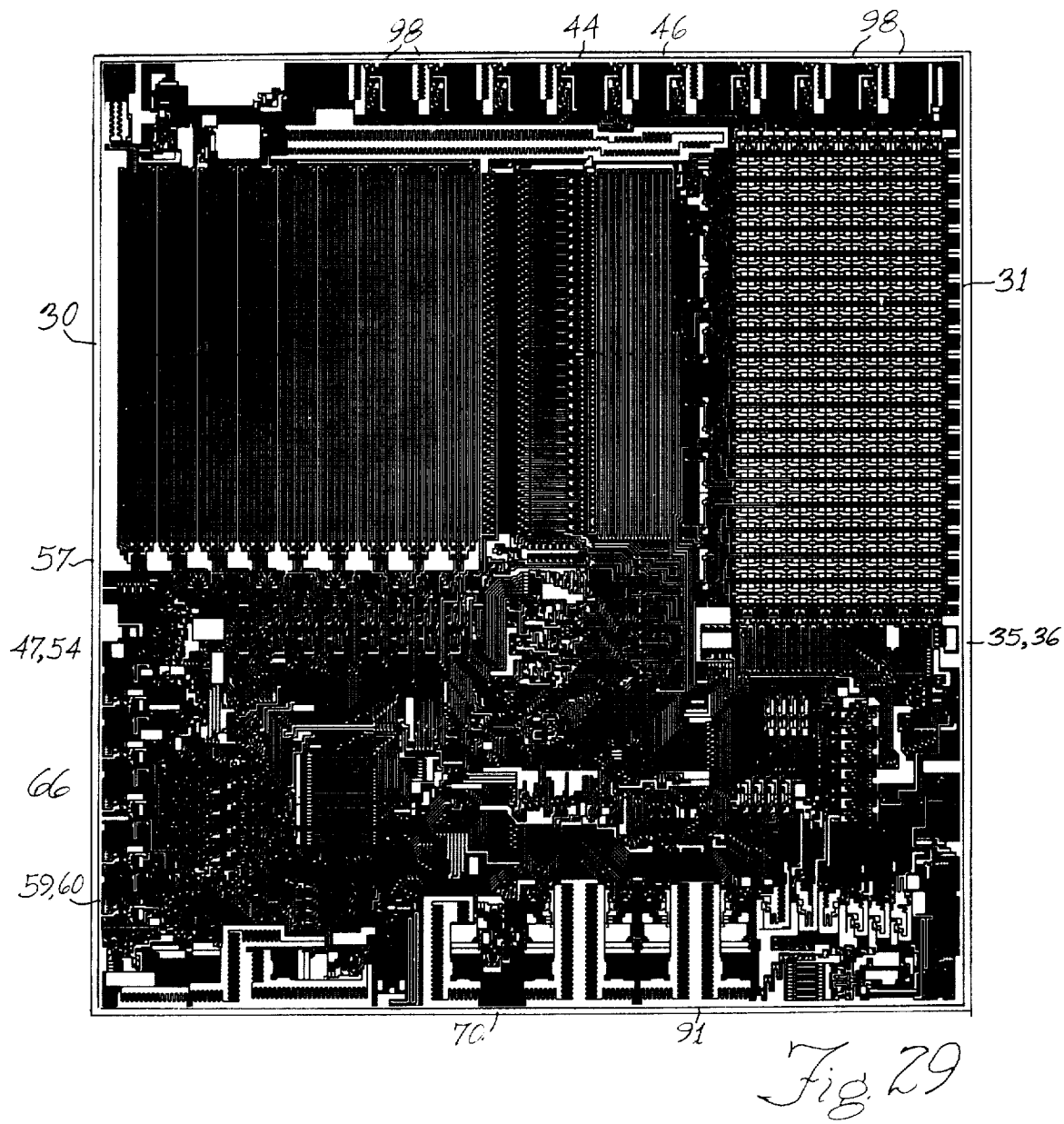
FIG. 29 is a plan view of the calculator chip herein described, showing a metal mask pattern, enlarged about 50×.

A semiconductor chip which contains the entire system of FIGS. 7a and 7b is illustrated. FIG. 29 shows a greatly enlarged plan view of the chip, using the same reference numerals as previously used in this description. The chip is only about two hundred mils or 0.2 inch on a side. In the example discussed, the chip is manufactured by the P-channel metal gate process, although it is understood that N-channel silicon gate or other processes could be used.

Alternative Embodiments

In place of the segment scan arrangement described, which is particularly adapted for calculators with LED displays, the system herein described may have a more general purpose output system as described in U.S. Pat. No. 3,991,305, issued Nov. 9, 1976, filed Nov. 19, 1974 by Raymond & Caudel, assigned to Texas Instruments. This output may drive a digit scan arrangement in a calculator system, or may address external ROM's or RAM's, or may be used as a general purpose controller or digital processor for appliance controllers, timers, metering systems, and the like.

Although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

TABLE I
TABLE OF MICROINSTRUCTIONS

STO
ACC to MEM; applied to the write control 38 via special status circuit 100; the four-bit output 79 from the accumulator 77 is applied by the write logic 38 and line 39 to the decode and I/O select circuitry 35 where it is written into the currently addressed word location in the RAM 31.

CKM
CKB to MEM; the four bits on CKB output lines 83 are applied via write logic 38 and lines 39 to the decode and I/O select circuitry 35 where it is written into the currently addressed word location in the RAM 31.

$\overline{\text{CKP}}$
CKB to +ALU; the four bits on CKB output lines 83 are applied to the positive input 73 of the adder 70 by input selector 71.

$\overline{\text{YTP}}$
Y to +ALU; the four bits on the output 78 of the Y Register 76 are applied to the positive input 73 of the adder 70 via input 80 and P input selector 71.

$\overline{\text{MTP}}$
MEM to +ALU; the four bits at the memory output lines 37 are applied to the positive input 73 of the adder 70 by the output selector 71.

$\overline{\text{ATN}}$
ACC to −ALU; the contents of the accumulator 77 are applied via lines 79 and 80 to the negative input 74 of the adder 70.

$\overline{\text{NATN}}$
$\overline{\text{ACC}}$ to −ALU; the complement of the accumulator 77 is applied via lines 79 and 82 to the negative input 74 of the adder 70.

$\overline{\text{MTN}}$
MEM to −ALU; the four bits at the then-current word and page address in the RAM 31 appearing on the memory output lines 37 are applied to the negative input 74 of the adder 70 by the input selector 72.

$\overline{\text{15TN}}$
15 (−1) to −ALU; a constant 15 or hex 1111 is applied to the negative input 74 of the adder 70; this is used in subtraction by two's complement addition, or in compare operations.

$\overline{\text{CKN}}$
CKB to −ALU; the four bits on the CKB output lines 83 are applied to the negative input 74 of the adder 70 by the input selector 72.

NE
COMP to STATUS; the compare output $\overline{\text{COMP}}$ if the adder 70 is applied by line 105 to the status circuit 104.

C8
CARRY 8 to STATUS; the carry output C3 from the MSB of the adder 70 is applied via line 101 to the status circuit 104.

CIN
Carry In to ALU; the carry input CO on the line 102 is allowed to be applied to the carry circuit of the LSB of the adder 70.

AUTA
ALU to ACC; the output of the adder 70 on the four lines 75 is applied to the input of the accumulator register 77.

AUTY
ALU to Y; the output of the adder 70 on the four lines 75 is applied to the input of the Y address register 76.

NDMTP
$\overline{\text{DAM}}$ to +ALU; the complement of the output of the DAM register is applied by input lines 85 to the positive input 73 of the adder 70 via selector gate 71.

DMTP
DAM to +ALU; the output of the DAM register is applied by input lines 84 to the positive input 73 of the adder 70 via selector gate 71.

SSE
Special Status Enable; the special status circuit 100 is allowed to respond to the carry and add latch level and set the latch 229.

SSS

Special Status Sample; the special status circuit 100 is caused to produce a CO output on the line 102 reflecting the status of the latch 229.

CME

Conditional Memory Enable; causes the STA command on the line 103 to be responsive to the condition of the latch in special status and to the condition of the add latch.

TABLE II

THE INSTRUCTION SET

CALL: 11XXXXXXX

Conditional on status; if status line 106 is a logic "0," then the CALL instruction is not performed. If status or STAT is "1," the machine goes into the CALL mode, as indicated by setting CLATCH of FIG. 21 to a logic "1." The contents of the program counter 47 are stored in the subroutine register 54. The page address is stored in the buffer 60. The contents of the buffer register 60 are used as the ROM page address. The field R2 to R8 of the instruction word is loaded into the program counter 47 from the lines 40. All instructions executed while in the CALL mode perform their normal functions, except for the CALL and branch instructions; execution of a CALL within a CALL mode is not valid; branches executed within a call mode must be within the same ROM page. CALL occupies one-fourth of the possible instructions, so there are 512 possible calls.

Branch (BRNC): 10XXXXXXX

Conditional on status; if status is a logic "0," then the branch instruction is not performed. If status or STAT on the line 106 is "1," then the field R2 through R8 of the instruction word is loaded into the program counter 47 from the lines 40, and the contents of the buffer register 60 become the new page address in the ROM page register 59, except when in the CALL mode. Branch (as well as CALL) can be unconditional because of the nature of status logic 104. Status is normally in logic "1" which is the proper condition for successfully performing a branch or CALL. If the instruction immediately preceding the branch or CALL does not affect status, then the operation will be successful. Status is valid for only one instruction cycle. It is therefore invalid to perform multiple tests before a branch operation. Only that instruction immediately preceding the branch instruction determines whether branching is successful. Status always returns to logic "1" after a branch instruction.

Load Y Register with a Constant (TCY): 00100XXXX

The C field of the instruction word, bits R5 thru R8, is transferred into the Y register 76. This is unconditional, and neither carry nor compare go to status logic 104 (NE and C8 are not actuated). The microinstructions generated for TCY are CKP and AUTY; TCY is one of the input lines 45 to the decoder 46.

Compare Y Register to a Constant (YNEC): 00101XXXX

The contents of the Y register 76 are compared to the field R5 to R8 of the instruction word. Compare information on line 105 is input to the status logic 104 by an NE microcode. Inequality will force status to a logic "1." This instruction is not conditional on status. The microinstructions generated are $\overline{\text{YTP}}$, $\overline{\text{CKN}}$ and NE.

Constant Store, Increment Y Register (TCMIY): 00110XXXX

The contents of the field R5 to R8 are stored directly into the memory location addressed by the X and Y registers 109 and 76. The Y register 76 is then incremented by one. The instruction is not conditional on status, and carry and compare do not go to status. Microinstructions generated: CKM, $\overline{\text{YTP}}$, $\overline{\text{CIN}}$, AUTY.

Accumulator Less than or Equal to Constant (ALEC): 01110XXXX

The accumulator 77 is subtracted from the field R5 to R8 of the instruction word on the lines 40, using 2's complement addition. The resulting carry information on line 101 is input to the status logic 104 by a command C8. If the accumulator is less than or equal to the constant, status will be set to a logic "1." The instruction is unconditional. R5 is the LSB of the constant, and R8 is the MSB. Microinstructions generated: $\overline{\text{CIN}}$, $\overline{\text{CKP}}$, NATN, C8.

Load P Register (LDP): 01000XXXX

The ROM page buffer register 60 is loaded with the four bits of the field R5 to R8 in the instruction word on the lines 40. This is unconditional and neither carry nor compare go to status. R5 is LSB and R8 is MSB. No microinstructions are generated.

Bit Set (SBIT): 0101000XX

The four bits at the memory location addressed by the X and Y registers 109 and 76 are selected. One of these four bits, as selected by the R7 and R8 field of the instruction word, is set to a logic "1." $\overline{\text{R7}}$, $\overline{\text{R8}}$ selects the LSB; R7, R6 selects the MSB. No microinstructions are generated.

Bit Reset (RBIT): 0101001XX

The four bits at the RAM 31 memory location addressed by the X and Y registers 109 and 76 are selected for write operation. One of these four bits, as selected by the field R7 and R8 of the instruction word on the line 40 via CKB logic 113, is reset to a logic "0."

Bit Test (TBIT): 0001000XX

The four bits at the memory location addressed by the X and Y registers 109 and 76 are selected. One of these four bits, as selected by the field R7 and R8 of the instruction word on the lines 40 via CKB circuit 113, is tested in the adder 70 by a compare operation. A logical "1" in the selected bit will set status circuit 104 to a logical "1," via compare output COMP on the line 105. Microinstructions generated: $\overline{\text{CKP}}$, $\overline{\text{CKN}}$, $\overline{\text{MPT}}$, NE.

Load X Register (LDX): 01001XXXX

An X or RAM page address register 109 is loaded from the field R5 to R8 of the instruction word on the lines 40. This is unconditional, and neither carry nor compare go to status logic 104. No microinstructions are generated at the outputs 68. That is used for a long branch, for example.

Transfer Accumulator to Memory and Increment Y (TAMIYC): 000101101

The contents of the accumulator 77 are stored in the RAM memory location addressed by the X and Y registers 109 and 76. After completion of the store operation, the Y register 76 is incremented by one; if the initial Y=15, status is set to "1." Unconditional. Microinstructions generated: STO, $\overline{\text{YTP}}$, $\overline{\text{CIN}}$, C8, AUTY.

Transfer Memory to Accumulator (TMA): 000101001

The four-bit contents of the RAM memory location currently addressed by the X and Y registers 109 and 76 are unconditionally transferred into the accumulator 77. Memory data in the RAM is unaltered. Unconditional, and carry and compare do not go to status. Microinstructions generated: $\overline{\text{MTP}}$, AUTA.

Transfer Memory to Y Register (TMY): 000101010

The contents of the RAM memory location currently addressed by the X and Y registers 109 and 76 are unconditionally transferred into the Y register 76. Memory data in the RAM is unaltered. Microinstructions generated on the lines 68: $\overline{\text{MTP}}$, AUTY.

Transfer Y Register to Accumulator (TYA): 000101011

The Y register 76 is unconditionally transferred into the accumulator 77. Contents of the Y register 76 are unaltered. Microinstructions generated: $\overline{\text{YTP}}$, AUTA.

Transfer Accumulator to Y Register (TAY): 000101000

The accumulator 77 is unconditionally transferred into the Y register 76. Accumulator contents are unaltered. Microinstructions generated $\overline{\text{ATN}}$, AUTY.

Add Memory and Accumulator (AMAAC): 000010101

The contents of the accumulator 77 are added to the contents of the RAM memory 31 location addressed by the X and Y registers 109 and 76 with the resulting sum stored into the accumulator 77. Resulting carry information on line 101 is input to the status logic 104. A sum that is greater than fifteen will set status to a logic "1." The contents of the memory location in the RAM 31 are unaltered. Microinstructions generated: $\overline{\text{ATN}}$, $\overline{\text{MTP}}$, AUTA, C8.

Accumulator Less than or Equal to Memory (ALEM): 000000001

If the accumulator 77 is less than or equal to the contents of the currently addressed location in the RAM 31, the status circuit 104 is set to logic "1." Microinstructions generated: $\overline{\text{MPT}}$, $\overline{\text{NATN}}$, $\overline{\text{CIN}}$, C8.

Memory Not Equal to Accumulator (MNEA): 000001001

If the contents of the currently addressed location in the RAM 31 are not equal to the contents of the accumulator 77, the status circuit 104 is set to logic "1." Microinstructions generated: $\overline{\text{MTP}}$, $\overline{\text{ATN}}$, NE.

Transfer K to Memory (TKM): 000001010

The data on the four K lines 112 is transferred to the currently addressed location in the RAM 31, via CKB circuit 113, lines 83, write control 38. Microinstructions generated: CKM.

DAM and Memory to Accumulator (DMEA): 000010000

The direct access memory or DAM is added to the currently addressed location in the other eight files of the RAM 31, special status circuit 100 is set, and the results go into the accumulator 77. Microinstructions generated: $\overline{\text{MTN}}$, $\overline{\text{DMTP}}$, SSS, AUTA.

Subtract Memory and Accumulator Subtract (SAMAN): 000110000

The contents of the accumulator 77 are subtracted from the contents of the RAM memory location addressed by the X and Y registers 109 and 76 using 2's complement addition with the difference stored into the accumulator 77. To do this, the memory is added to the complement of the accumulator plus one (or $\overline{\text{CIN}}$) and the sum is stored in the accumulator. Resulting carry information is input to status 104. Status will be set to logic "1" if the accumulator is less than or equal to the memory. Microinstructions generated: $\overline{\text{MTP}}$, $\overline{\text{NATN}}$, $\overline{\text{CIN}}$, C8, AUTA Load Incremented Memory (IMAC): 000110010

The content of the RAM memory location addressed by the X and Y registers 109 and 76 is incremented by one and stored into the accumulator 77. The original contents of the RAM memory 31 are unaltered. Resulting carry information is input via line 101 to the status logic 104. Status will be set to a logic "1" if the sum is greater than fifteen. Microinstructions generated: $\overline{\text{MTP}}$, $\overline{\text{CIN}}$, C8, AUTA.

DAM plus Negative Accumulator (DNAA): 000010001

The contents of the direct access memory DAM are added to the complement of the accumulator 77, special status circuit 100 is set, and the result stored in the accumulator. Microinstructions generated: $\overline{\text{DMTP}}$, $\overline{\text{NATN}}$, SSS, AUTA.

Conditional Carry Load Accumulator (CCLA): 000010010

If the special status circuit 100 is at logic "0," the accumulator 77 is set to all zeros; if special status is at logic "1," the accumulator is set to "0001." Microinstructions generated: AUTA, SSS.

Negative DAM plus Memory to Accumulator (NDMEA): 000010011

The contents of the currently adressed memory location are added to the complement of the DAM output as it appears on the lines 85, special status circuit 100 is set, and the result goes to the accumulator 77. Microinstructions generated: $\overline{\text{MTN}}$, $\overline{\text{NDMTP}}$, SSS, AUTA.

Conditional Transfer to Memory, Decrement Y (CTMDYN): 000011000

If the ADD latch 120 is set and special status circuit 100 is at logic "1," the accumulator 77 is transferred to the currently addressed RAM 31 memory location, of if the ADD latch is reset and special status is at "0," the accumulator is transferred to memory, the Y register 76 is decremented. If the initial Y=0, the status circuit 104 is set to logic "1." Microinstructions generated: $\overline{\text{YTP}}$, $\overline{\text{15TN}}$, C8, AUTY, CME.

Decremented Memory to Accumulator (DMAN): 000000111

The contents of the RAM memory location currently addressed by the X and Y registers 109 and 76 are decremented by one and loaded into the accumulator 77. Memory contents are unaltered. Resulting carry information is input to the status logic. If memory is greater than or equal to one, status will be set to logic "1." Microinstructions generated: $\overline{\text{MTP}}$, $\overline{\text{15TN}}$, C8, AUTA Increment Y register (IYC): 000000101

The contents of the Y register 76 are incremented by one. Resulting carry information is input to the status logic 104. A sum greater than fifteen will set status to a logic "1." Microinstructions generated: $\overline{\text{YTP}}$, $\overline{\text{CIN}}$, C8, AUTY.

Decrement Y Register (DYN): 000000100

The contents of the Y register 76 are decremented by one. Resulting carry information is input to the status logic 104. If Y is not equal to 1, status will be set to a logic "1." Microinstructions generated: $\overline{\text{YTP}}$, $\overline{\text{15TN}}$, C8, AUTY.

Exchange Memory and Accumulator (XMA): 000000011

The contents of the RAM memory location addressed by the X and Y registers 109 and 76 are exchanged with the accumulator 77. That is, the accumulator is stored into memory and memory is transferred into the accumulator. Microinstructions generated: $\overline{\text{MTP}}$, STO, AUTA.

Clear Accumulator (CLA): 000000110

The contents of the accumulator 77 are unconditionally set to zero. Microinstructions generated: AUTA Compare Y Register to the Accumulator (YNEA): 000000010

The contents of the Y register 76 are compared to the contents of the accumulator 77. Comparison information COMP is input via line 105 to the status logic 104. Inequality between the Y register and the accumulator will set status to a logic "1." Microinstructions generated: $\overline{\text{YTP}}$, $\overline{\text{ATN}}$, NE.

Transfer Accumulator to Memory (TAM): 000101111

The contents of the accumulator 77 are stored into the RAM memory location addressed by the X and Y registers 109 and 76. Accumulator 77 contents are unaffected. The special status circuit 100 generates STA by gates 236 and 237. Microinstructions generated: STO.

Transfer Accumulator to Memory and Clear Accumulator (TAMZA): 000101110

The contents of the accumulator 77 are stored into the RAM memory location addressed by the X and Y registers 109 and 77. The accumulator 77 is then reset to zero. Microinstructions generated: STO, AUTA.

Complement and Increment Accumulator (CPAIZ): 000110001

The complement of the contents of the accumulator 77 are incremented by one and the result stored in the accumulator; if the initial accumulator contents are zero, the status circuit 104 is set to "1." Microinstructions generated: $\overline{NATN}$, $\overline{CIN}$, C8, AUTA.

Complement X Register (COMX): 000000000

The contents of the three LSB's of the X or RAM page address register 109 are logically commplemented. No microinstructions are generated.

Transfer K Line to the Accumulator, Load External Inputs (TKA): 000001000

Data present on the four external K input lines 112 is transferred into the accumulator 77. Microinstructions generated: $\overline{CKP}$, AUTA.

Test External Inputs, K Not Equal Zero (KNEZ): 000001110

Data on the K input lines 112 is compared to zero. Comparison information is input to the status logic 104. Non-zero input data will set status to a logic "1." Microinstructions generated: $\overline{CKP}$, NE.

Transfer Data Out (TDO): 010110000

The three LSB's of the accumulator 77 are transferred to the segment latches 87, and the contents of the digit buffers 94 loaded into the digit latches 97. No microinstructions generated.

Set Output Register (SETR): 000001101

Loads the digit buffer 94 from lines 32 and DDIG, and decrements the Y register 76. If the initial Y=0, the status circuit 104 is set to logic "1." Microinstructions generated: $\overline{YTP}$, $\overline{15TN}$, AUTY, C8.

Return (RETN): 00001111

Resets the ADD latch 120, and resets the branch latch 122. When executed in the CALL mode, the contents of the subroutine register 54 are transferred into the program counter 47. Simultaneously, the contents of the buffer register 60 are transferred into the ROM page address register 59. This operation will return the system to the proper point after a subroutine has been executed. No microinstructions generated.

Exchange DAM and Accumulator (XDA): 000011001

The DAM is exchanged with the accumulator 77. Microinstructions: $\overline{DMTP}$, AUTA, STO.

Transfer Accumulator to Memory, Decrement Y (TAMDYN): 000101100

The contents of the accumulator 77 are transferred to the currently addressed location in the memory 31, and the Y register 76 is decremented. If the initial Y=0, the status circuit 104 is set to "1." Microinstructions: STO, $\overline{YTP}$, $\overline{15TN}$, AUTY, C8.

Memory Not Equal Zero (MNEZ): 000110011

If the contents of the currently addressed memory location in RAM 31 do not equal zero, the status circuit 104 is set to logic "1." Microinstructions: $\overline{MTP}$, NE.

Accumulator plus Constant to Accumulator (ACACC): 00111XXXX

Add the contents of the accumulator to the R5 to R8 field of the current instruction word on the lines 40, via CKB lines 83, and store the result in the accumulator. If a carry C3 is generated, the status circuit 104 is set to "1." Microinstructions: $\overline{CKP}$, $\overline{ATN}$, C8, AUTA.

Set Add Latch (SAL): 010110001

The ADD latch 120 is set to logic 1; ADD line 226 is at Vss. Microinstructions: none.

Complement X8 (COMX8): 010110010

The "8" bit of the RAM X or page adress register 109 is complemented. This bit addresses the DAM for write-in. Microinstructions: none.

Set Branch Latch (SBL): 010110011

The branch latch 122 is set to logic "1," so the BL line 123 will be at Vss. Microinstructions: none.

Reset End Around Carry (REAC): 010110100

The special status circuit 100 (or end around carry) is set to a logic "0." Microinstructions: none.

Set End Around Carry (SEAC): 010110101

The special status circuit is set to logic "1." No microinstructions.

Add Constant to Negative Accumulator (ACNAA): 01100XXXX

A constant defined by the R5 to R8 field of the current instruction word is added to the complement of the accumulator as it appears on the lines 82, and the result is stored in the accumulator 77. Microinstructions: $\overline{CKP}$, NATN, AUTA.

Transfer Accumulator to Memory, Add Constant, Set (TAMACS): 01101XXXX

Transfer the accumulator 77 to the currently addressed location in the RAM 31, and add a constant defined by the R5 to R8 field of the current instruction word on the lines 40. If the ADD latch 120 is set, and if a carry C3 from the accumulator exists for this or previous instruction cycle, set the special status circuit 100 to "1." Or, if the ADD latch 120 is reset and if a carry C3 exists from the adder on only the previous instruction cycle, set the special status circuit 100 to "1." Microinstructions: STO, $\overline{ATN}$, $\overline{CKP}$, AUTA, SSE.

Accumulator Less than or Equal to Constant (ALEC): 01110XXXX

If the contents of the accumulator 77 are equal to or less than a constant defined by R5 to R8 on the current instruction word, the status circuit 104 is set to "1."

Y and Constant to Y (YMCY): 01111XXXX

The contents of the Y register 76 are added to a constant defined by the R5 to R8 of the current instruction word plus "1," and the result stored in the Y register. Microinstructions: $\overline{CIN}$, $\overline{YTP}$, $\overline{CKN}$, AUTY.

What is claimed:

1. An electronic digital processor system of the type implemented in a semiconductor LSI device, said system having a bit-parallel arithmetic unit with first and second inputs and an output, the arithmetic unit performing during a machine cycle arithmetic and logic operations on digits of numerical information applied to said inputs, one digit being produced at said output for each machine cycle, each digit having a plurality of parallel bits, memory means having input/output means and having a plurality of memory locations, addressing means associated with the memory means for selecting in response to command signals one of the plurality of memory locations for storing digits of numerical information in the memory means via the input/output means or recalling such information from the memory means via the input/output means, selector means coupled to the first and second inputs of the arithmetic unit for selecting in response to command signals any one of a plurality of different sources of digits of numerical information including said input/output means of the memory means and for applying such information to said inputs of the arithmetic unit, a carry output from the arithemtic unit and a carry input to the arithmetic unit, and logic means for applying a carry to the carry input in response to whether or not a carry was generated in the arithmetic unit at the carry output for the operation performed on the digits of numerical information by the arithmetic unit for either the digits applied to the inputs of the arithmetic unit during the current machine cycle or the digits applied to the inputs of the arithmetic unit during the previous machine cycle.

2. An electronic digital processor system according to claim 1, including an instruction memory, instruction addressing means for selecting predetermined instructions in the instruction memory by incrementing a previous address or by jumping to a new address, means for decoding the instructions to provide command signals, and means connecting the command signals to the arithmetic unit and the selector means for controlling the operation thereof.

3. An electronic digital processor system according to claim 2, including a latch which may be set or reset by command signals from the means for decoding, the logic means being coupled to the latch and responsive to whether the latch is in the set or reset condition.

4. An electronic digital processor system according to claim 3 including a status circuit which is connected to receive the carry output from the arithmetic unit, the status circuit having set and reset conditions and switching between such conditions in response to the carry output.

5. An electronic digital processor system according to claim 4 wherein the status circuit is set when a carry is present at the carry output and is reset when no carry is produced by the arithmetic unit at the carry output.

6. An electronic digital processor system according to claim 5 including a second status circuit which can be set or reset when enabled by command signals from the means for decoding, the logic means being responsive to whether the second status circuit is set or reset.

7. An electronic digital processor system according to claim 6 wherein the second status circuit is responsive to whether the latch is set or reset.

8. An electronic digital processor system according to claim 7 wherein the second status circuit is responsive to the carry output from the arithmetic unit.

9. An electronic digital processor system according to claim 3 including a special status circuit which is connected to receive the carry output from the arithmetic unit for the digits applied to the inputs of the arithmetic unit during the current machine cycle and the digits applied to the inputs of the arithmetic unit during the previous machine cycle, the special status circuit being a part of said logic means.

* * * * *